US012794231B2

(12) United States Patent
Hamaguchi et al.

(10) Patent No.: US 12,794,231 B2
(45) Date of Patent: Nov. 10, 2026

(54) OPERATION SUPPORT DEVICE, OPERATION SUPPORT METHOD, AND OPERATION SUPPORT PROGRAM

(71) Applicant: IHI Corporation, Tokyo (JP)

(72) Inventors: Kenichi Hamaguchi, Tokyo (JP); Akinobu Inamura, Tokyo (JP)

(73) Assignee: IHI CORPORATION, Tokyo (JP)

(*) Notice: Subject to any disclaimer, the term of this patent is extended or adjusted under 35 U.S.C. 154(b) by 414 days.

(21) Appl. No.: 18/441,031

(22) Filed: Feb. 14, 2024

(65) Prior Publication Data

US 2024/0305097 A1 Sep. 12, 2024

(30) Foreign Application Priority Data

Mar. 8, 2023 (JP) ................................. 2023-035812

(51) Int. Cl.
*H02J 3/28* (2026.01)
*H02J 3/00* (2026.01)

(52) U.S. Cl.
CPC ................ *H02J 3/003* (2020.01); *H02J 3/28* (2013.01)

(58) Field of Classification Search
CPC .......... H02J 3/003; H02J 3/28; H02J 2101/20; H02J 2101/24; H02J 3/32; H02J 3/381; H02J 7/35
See application file for complete search history.

(56) References Cited

U.S. PATENT DOCUMENTS

| | | | |
|---|---|---|---|
| 2016/0124451 | A1 | 5/2016 | Yoshitani |
| 2021/0234372 | A1 | 7/2021 | Inoue |
| 2021/0305606 | A1 | 9/2021 | Murai et al. |
| 2022/0094162 | A1 | 3/2022 | Lee |

FOREIGN PATENT DOCUMENTS

| | | | |
|---|---|---|---|
| JP | 2005-048207 | A | 2/2005 |
| JP | 2007-159341 | A | 6/2007 |
| JP | 2012-135064 | A | 7/2012 |
| JP | 2016-167420 | A | 9/2016 |
| JP | 6189448 | B2 | 8/2017 |

(Continued)

OTHER PUBLICATIONS

Liu et al. "Optimal scheduling strategy of electricity-heat-hydrogen integrated energy system under different operating modes" from"Int J Energy Res. 2022;46:12901-12925." (Year: 2022).*

*Primary Examiner* — Yuhui R Pan

(57) ABSTRACT

The generation of surplus power in a power generation system using renewable energy is prevented. An operation support device for making a start determination regarding preparation for the operation of a load device includes a determination unit that makes a start determination regarding preparation for the operation of the load device when history information indicating the history of the energy storage amount in an energy storage device corresponds to a predetermined state. The load device is a device that requires a preparation time from the start of operation preparation to the start of operation, and can consume during operation at least one of the power generated by a power generation device using renewable energy and the discharged power of the energy storage device that can store power generated by the power generation device.

9 Claims, 16 Drawing Sheets

(56) References Cited

FOREIGN PATENT DOCUMENTS

| | | | | |
|---|---|---|---|---|
| JP | 2020054085 | A | * | 4/2020 |
| JP | 2020-137379 | A | | 8/2020 |
| JP | 2021-164178 | A | | 10/2021 |
| JP | 2022-020978 | A | | 2/2022 |
| JP | 2022-139148 | A | | 9/2022 |
| JP | 2022-148449 | A | | 10/2022 |
| WO | 2020/121436 | A1 | | 6/2020 |

* cited by examiner

OPERATION SUPPORT DEVICE, OPERATION SUPPORT METHOD, AND OPERATION SUPPORT PROGRAM

CROSS REFERENCE TO RELATED APPLICATIONS

This application claims the benefit of priority from Japanese Patent Application No. 2023-035812, filed on Mar. 8, 2023, the entire contents of which are incorporated herein by reference.

TECHNICAL FIELD

The present disclosure relates to an operation support device, an operation support method, and an operation support program for determining the start of preparation for the operation of a load device.

BACKGROUND

In order to reduce greenhouse gas emissions, synthetic methane production technology (methanation) has been drawing attention. Synthetic methane is produced by reacting carbon dioxide with hydrogen. Methanation is recognized as an important technology towards achieving so-called carbon neutrality, such as a case where synthetic methane produced using carbon dioxide emitted by factories and the like can be used in factories and the like and a case where the produced synthetic methane can be sent through city gas pipes. In order for synthetic methane produced by methanation to be carbon neutral, it is desirable that the power used for production comes from renewable energy such as wind power and solar power.

The supply of power using renewable energy may be unstable due to the influence of weather, time of day, and the like. The generated power can be stored in a power storage system constructed in a microgrid to which the power generation device belongs. However, when the SoC (State of Charge) of the power storage system exceeds the operational upper limit, surplus power is generated. When surplus power is generated, the surplus power should be transmitted to an external power system or the generation of power should be suppressed. For this reason, it is preferable to consume power by operating a load device such as a methanation device. Japanese Unexamined Patent Publication No. 2020-54085 describes a system that makes a power transmission plan on the basis of a predicted value of surplus power based on the difference between a predicted value of power generated by renewable energy and a predicted value of power demand and produces hydrogen when the SoC of a storage battery exceeds a set value.

However, a load device such as a methanation device cannot operate immediately in a power-consumable state even after receiving an activation instruction, and requires a preparation time from the start of operation preparation based on the activation instruction to the start of operation when power can be consumed. In the system described in Japanese Unexamined Patent Publication No. 2020-54085, it is assumed that the hydrogen production equipment can consume power immediately after the activation instruction, but the preparation time is not taken into consideration. For this reason, there have been cases where the generation of surplus power is not prevented.

SUMMARY

Therefore, it is an object of one aspect of the present disclosure to provide a technique for preventing surplus power from being generated in a power generation system using renewable energy.

In order to solve the aforementioned problems, an operation support device according to an aspect of the present disclosure is an operation support device for making a start determination regarding preparation for an operation of a load device, and includes a determination unit that makes a start determination regarding preparation for an operation of the load device when history information indicating a history of an energy storage amount in an energy storage device corresponds to a predetermined state. The load device is a device that requires a preparation time from start of operation preparation to start of operation, and can consume during operation at least one of power generated by a power generation device using renewable energy and discharged power of the energy storage device that can store power generated by the power generation device.

In order to solve the aforementioned problems, an operation support method according to an aspect of the present disclosure is an operation support method in an operation support device for making a start determination regarding preparation for an operation of a load device, and includes: making a start determination regarding preparation for an operation of the load device when history information indicating a history of an energy storage amount in an energy storage device corresponds to a predetermined state. The load device is a device that requires a preparation time from start of operation preparation to start of operation, and can consume during operation at least one of power generated by a power generation device using renewable energy and discharged power of the energy storage device that can store power generated by the power generation device.

In order to solve the aforementioned problems, an operation support program according to an aspect of the present disclosure is an operation support program causing a computer to function as an operation support device for making a start determination regarding preparation for an operation of a load device, and the program causes the computer to realize a determination function for making a start determination regarding preparation for an operation of the load device when history information indicating a history of an energy storage amount in an energy storage device corresponds to a predetermined state. The load device is a device that requires a preparation time from start of operation preparation to start of operation, and can consume during operation at least one of power generated by a power generation device using renewable energy and discharged power of the energy storage device that can store power generated by the power generation device.

According to the above aspects, when the history information of the energy storage amount corresponds to the predetermined state, a determination is made to start preparation for the operation of the load device, which requires a preparation time before reaching an operation state in which power can be consumed. Therefore, by performing the processing for determining the start of operation preparation in advance at an appropriate timing, it is possible to bring the load device into an operation state in which power can be consumed at a desired timing.

In the operation support device according to another aspect, the history information may include a first value indicating the energy storage amount at a first point in time, which is a point in time before current time, and a second value indicating the energy storage amount at at least one point in time before the first point in time.

According to the above aspect, since not only the value of the energy storage amount at a predetermined point in time but also the value of the energy storage amount before that point in time is used to determine the start of operation preparation, the tendency of the transition of the energy storage amount is taken into consideration. Therefore, it is possible to accurately determine the start of operation preparation.

In the operation support device according to another aspect, the determination unit may make the start determination when the history information corresponds to a predetermined state in which surplus power is predicted to be generated in a predetermined range of power grid including at least the power generation device and the energy storage device.

According to the above aspect, since the start of preparation for the operation of the load device is determined in advance of when the generation of surplus power is predicted, the generation of surplus power is prevented.

In the operation support device according to another aspect, the determination unit may make the start determination when the history information corresponds to a predetermined state in which the energy storage amount of the energy storage device is predicted to exceed a predetermined first threshold value.

According to the above aspect, since the determination is made according to whether or not the energy storage amount is predicted to exceed the first threshold value, the generation of surplus power is predicted with high accuracy.

In the operation support device according to another aspect, the determination unit may make the start determination when the energy storage amount at the first point in time is equal to or greater than a predetermined second threshold value or when the energy storage amount at the first point in time is equal to or greater than a predetermined third threshold value and the energy storage amount at the first point in time has increased by a predetermined amount or more from that at a second point in time, which is a point in time set earlier than the first point in time by a predetermined time.

According to the above aspect, the start determination is made when the energy storage amount at the first point in time is equal to or greater than the predetermined value or when the rate of increase in the energy storage amount in a predetermined period up to the first point in time is equal to or greater than a predetermined level. That is, not only the value of the energy storage amount at a predetermined point in time but also the tendency of increase in the energy storage amount is taken into consideration. Therefore, it is appropriately determined whether or not the generation of surplus power is predicted.

In the operation support device according to another aspect, the determination unit may make the start determination when a transition of the energy storage amount during a time from a second point in time, which is a point in time set earlier than the first point in time by a predetermined time, to the first point in time corresponds to at least one surplus power generation pattern set in advance as an energy storage amount transition pattern in which the energy storage amount exceeds the first threshold value.

According to the above aspect, since the determination processing is performed according to whether or not the transition of the energy storage amount in the predetermined period up to the first point in time corresponds to the predetermined energy storage amount transition pattern, the generation of surplus power is easily predicted and the operation preparation start determination is easily made.

In the operation support device according to another aspect, the determination unit may calculate a predicted value of the energy storage amount after current time in time series based on the history information by using a predetermined prediction model constructed based on records information regarding a transition of the energy storage amount in the energy storage device, and make the start determination when the predicted value within a predetermined prediction target period after the current time exceeds the first threshold value.

According to the above aspect, the transition of the energy storage amount after the current time is predicted by using the prediction model for predicting the transition of the energy storage amount, and the operation preparation start determination is made when the predicted value within the prediction target period exceeds the predetermined threshold value. Therefore, it is possible to easily predict the generation of surplus power and determine the start of operation preparation.

In the operation support device according to another aspect, the determination unit may perform the start determination when the operation of the load device has not started.

According to the above aspect, when the load device is already in the operation state, the operation start determination processing is not performed. Therefore, unnecessary execution of the operation preparation start determination processing is prevented.

The operation support device according to another aspect may further include an output unit that outputs information indicating the start determination in a predetermined form.

According to the above aspect, the result of the operation preparation start determination can be provided to activate the load device.

In the operation support device according to another aspect, the output unit may transmit the information indicating the start determination to the load device as operation preparation start information for causing the load device to start operation preparation.

According to the above aspect, the load device can be activated immediately by transmitting the operation preparation start information to the load device.

In the operation support device according to another aspect, the output unit may output the information indicating the start determination in at least one form of a display and a sound recognizable by humans.

According to the above aspect, since the information indicating the start determination is output in the form of display, sound, and the like, it is possible to prompt the operator of the load device to make a determination regarding activation.

According to one aspect of the present disclosure, it is possible to prevent surplus power from being generated in the power generation system using renewable energy.

DETAILED DESCRIPTION

Figure 1:
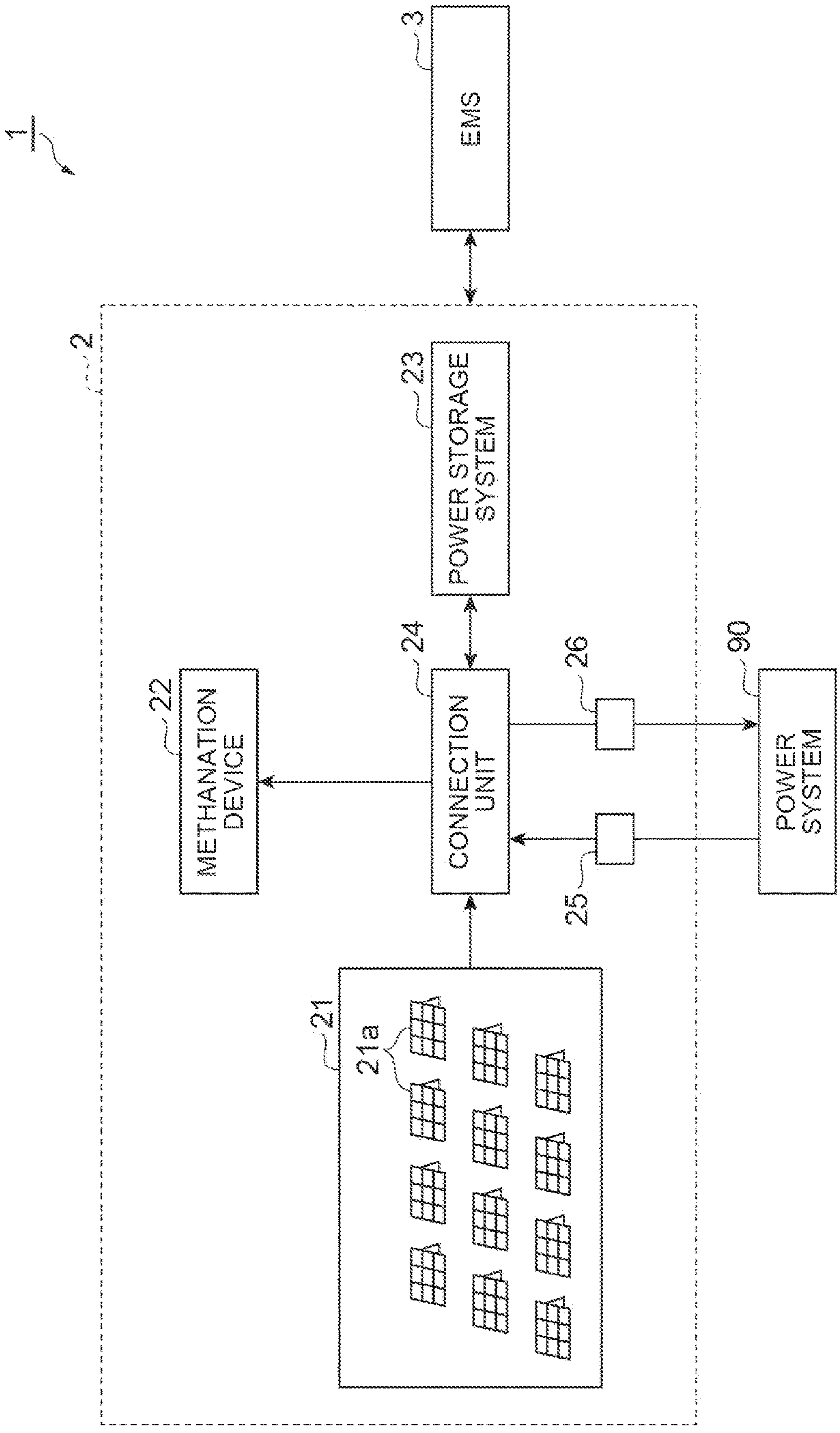
FIG. 1 is a schematic diagram of a power supply system according to an embodiment.

Hereinafter, embodiments of the present disclosure will be described in detail with reference to the accompanying diagrams. In addition, in the description of the diagrams, the same or equivalent elements are denoted by the same reference numerals, and the repeated description thereof will be omitted.

FIG. 1 is a schematic configuration diagram of a power supply system 1 according to an embodiment. As shown in FIG. 1, the power supply system 1 includes a microgrid 2 and an energy management system 3 (operation support device). Hereinafter, the "energy management system" will be referred to as an "EMS". The microgrid is generally a small-scale power grid that brings together energy supply sources and consumption facilities within a predetermined range. The microgrid 2 in the present embodiment includes a solar power generation system 21, a methanation device 22 (load device), a power storage system 23, a connection unit 24, a received power measurement unit 25, and a transmitted power measurement unit 26. In addition, the microgrid 2 is connected to an external power system 90, so that it is possible to transmit and receive power to and from the power system 90.

The solar power generation system 21 is an example of a power generation device using renewable energy. The solar power generation system 21 is a system that performs photovoltaic (PV) power generation, and includes a solar panel 21*a* and a power conditioner (power conditioning system: PCS) (not shown). The power conditioner may be called a PV-PCS. The PV-PCS converts direct current to alternating current.

In addition, in the present disclosure, the type of power generation system using renewable energy is not limited to solar power generation. For example, the power generation system using renewable energy may be a wind power generation system, a geothermal power generation system, a biomass power generation system, or a waste power generation system. In the solar power generation system, the amount of generated power fluctuates due to the influence of weather conditions (solar radiation, temperature, snowfall, and the like). In addition, in the wind power generation system, the amount of generated power fluctuates due to the influence of wind speed. In addition, in biomass power generation and waste power generation, the properties of biomass and garbage (waste, sludge, and the like) used as raw materials are generally not stable, and the output is unstable due to temporary contamination of materials unsuitable for incineration. Therefore, the various power generation methods described above are methods to which a method described in the present disclosure can be effectively applied, similar to solar power generation.

The methanation device 22 is an example of a load device. The methanation device 22 is a device for producing synthetic methane, and synthetic methane is produced by reacting carbon dioxide with hydrogen. The methanation device 22 consumes during operation at least one of the power generated by the solar power generation system 21 and the discharged power of the power storage system 23 capable of storing the power generated by the solar power generation system 21 when the methanation device 22 is operated.

The methanation device 22 in the present embodiment requires a preparation time from the start of operation preparation to the start of operation when power can be consumed. The methanation reaction using a catalyst is an exothermic reaction. However, in order to start the reaction, it is necessary to raise the temperature to a predetermined temperature (250° C. to 450° C.). Therefore, it is difficult to instantaneously start methane production from a stopped state (normal temperature and normal pressure) of the device. For this reason, it is necessary to raise the temperature of the methanation device 22 before the start of production. The time required for this temperature increase differs depending on a heating method (electric heater type, steam heater type), the scale of a device, and a device temperature at the start of temperature increase, but, for example, 15 minutes to 5 hours is required. In addition, the preparation time of the methanation device 22 may be 5 minutes or more.

In addition, the load device in the microgrid 2 is not limited to the methanation device 22, and another load device may be used. The load device applied to the microgrid 2 in the present embodiment is a device that requires a preparation time from the start of operation preparation to the start of operation when power can be consumed.

The power storage system 23 is an example of an energy storage device. The power storage system 23 stores the power generated by the solar power generation system 21, and supplies power to the methanation device 22. The power storage system 23 includes a storage battery.

The power storage system 23 in the present embodiment stores surplus power from solar power generation during the day, and discharges the power at night to supply power to consumers (not shown). Such a method of using the power storage system is called power peak shift or energy shift, and is widely implemented in factories, public facilities, buildings, and the like where storage batteries are installed for the purpose of reducing the amount of purchased power. The charge/discharge command may be created within the power storage system 23 or may be created by the EMS 3.

The storage battery is a general term for devices having a function of storing and supplying power. Examples of the storage battery may include general storage batteries such as a lead-acid battery, a lithium-ion secondary battery, an all-solid-state battery, a nickel-hydrogen battery, a nickel-cadmium battery, a nickel-iron battery, a nickel-zinc storage battery, a silver oxide-zinc storage battery, and a cobalt titanium lithium secondary battery. The storage battery may be a liquid circulation type storage battery such as a redox flow battery, a zinc-chlorine battery, or a zinc-bromine battery. The storage battery may be a mechanical charge type storage battery such as an aluminum-air battery, a zinc-air battery, or an air-iron battery. The storage battery may be a high-temperature operation type storage battery such as a sodium-sulfur battery, a lithium-iron sulfide battery, an electron trap type, or a semiconductor secondary battery. In addition, the storage battery (secondary battery) is a general term for devices which can be charged with power and/or from which power can be discharged. It is assumed that the power storage system 23 also includes a storage battery PCS that converts direct current of the power storage system 23 into alternating current and a device for monitoring the remaining amount of the storage battery. Each storage battery may be replaced with an energy storage device having a similar function, such as a condenser, a flywheel, compressed air energy storage (CAES) equipment, pumped storage power generation equipment, and thermal storage power generation equipment that temporarily stores electricity as heat and reconverts the heat into electricity when needed.

The connection unit 24 has a function of distributing power to each unit including the external power system 90. The connection unit 24 is, for example, a distribution board. The connection unit 24 distributes power to each unit based on an instruction from the EMS 3, for example. The received power measurement unit 25 and the transmitted power measurement unit 26 measure the received power and the transmitted power, respectively, with respect to the external power system 90.

Figure 2:
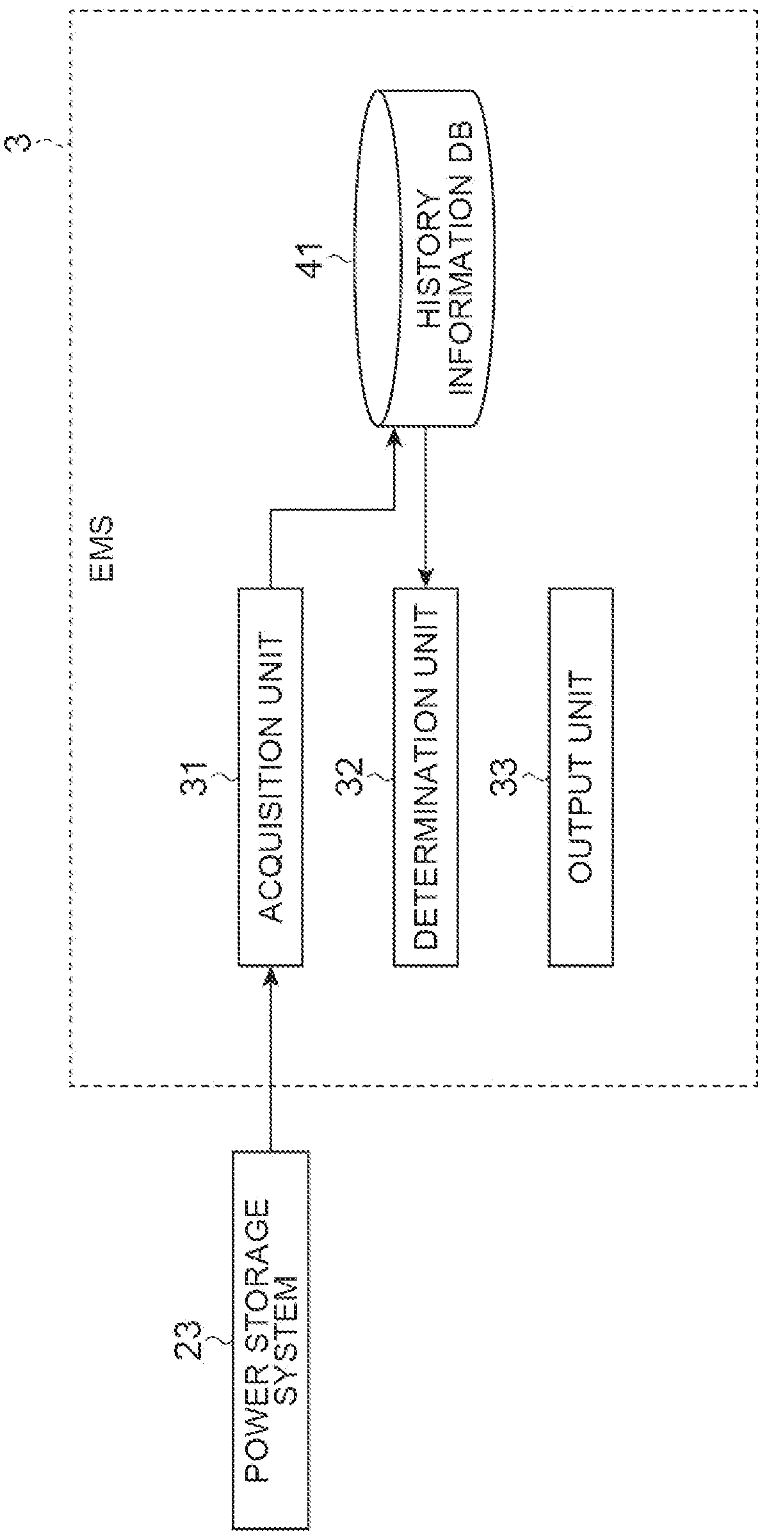
FIG. 2 is a block diagram showing the functional configuration of EMS.

FIG. 2 is a block diagram showing the functional configuration of the EMS 3 according to the present embodiment. The EMS 3 functions as an operation support device that determines the start of preparation for the operation of the methanation device 22, which is a load device. In addition, the EMS 3 is a device to monitor the movement and transfer of power in the microgrid 2. In FIG. 2, only functional units related to the functions of the operation support device in the present disclosure, among various functions of the EMS 3, are shown. For example, the EMS 3 has a trend data storage function, a demand monitoring function, and the like as functions other than those shown in FIG. 2. However, these functional units are omitted.

As shown in FIG. 2, the EMS 3 includes an acquisition unit 31, a determination unit 32, and an output unit 33. In addition, the EMS 3 may further include a history information DB 41.

Figure 3:
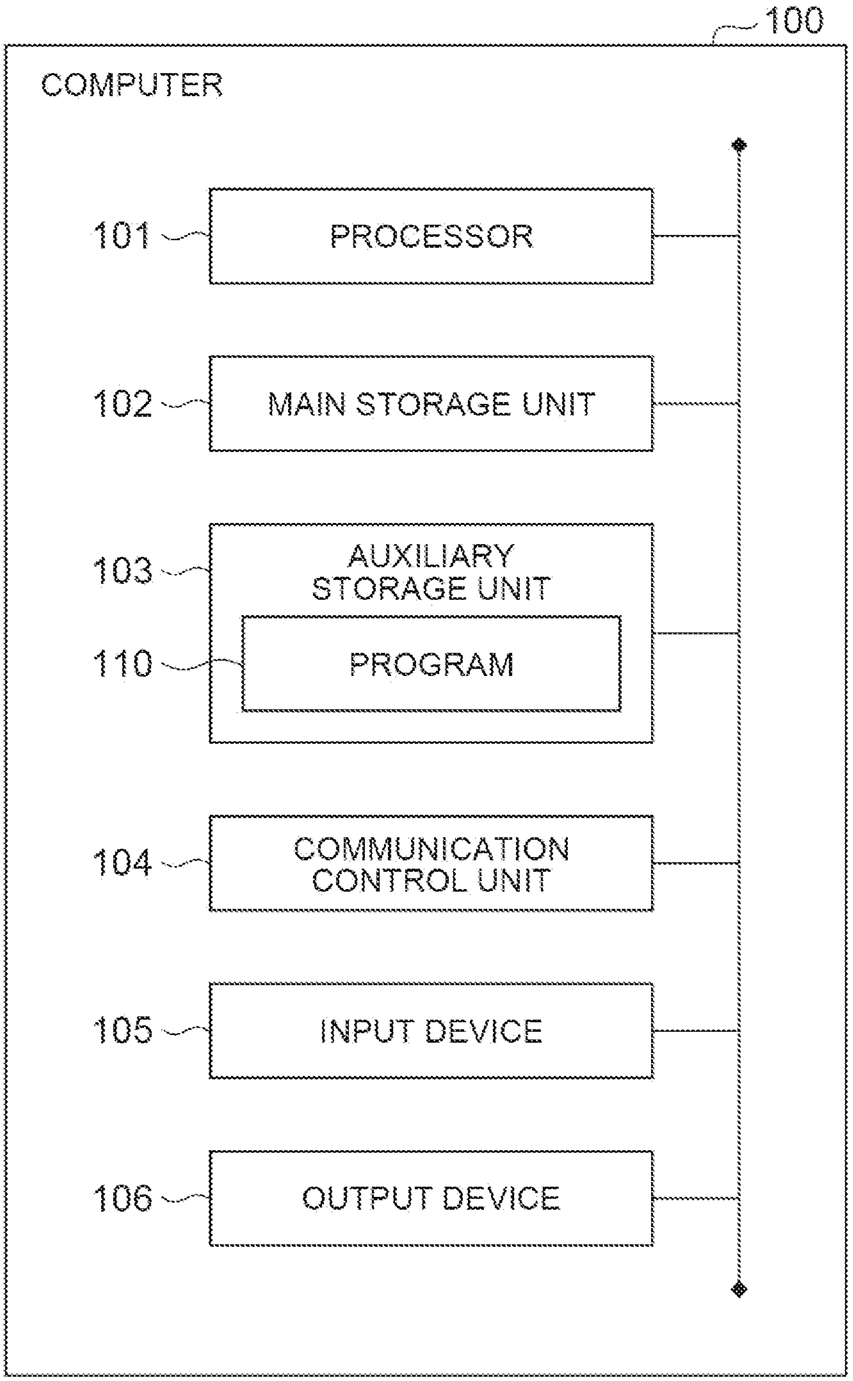
FIG. 3 is a diagram showing the hardware configuration of EMS.

Next, the hardware configuration of the EMS 3 will be explained with reference to FIG. 3. FIG. 3 is a diagram showing an example of the hardware configuration of the EMS 3. The EMS 3 includes one or more computers 100. The computer 100 includes a processor 101, a main storage unit 102, an auxiliary storage unit 103, a communication control unit 104, an input device 105, and an output device 106. The EMS 3 is configured by one or more computers 100 configured by these hardware components and software such as a program.

When the EMS 3 is configured by a plurality of computers 100, these computers 100 may be connected locally, or may be connected through a communication network such as the Internet or an intranet. By this connection, one EMS 3 is logically constructed.

The processor 101 executes an operating system, application programs, and the like. The main storage unit 102 includes a read only memory (ROM) and a random access memory (RAM). The auxiliary storage unit 103 is a storage medium, such as a hard disk and a flash memory. The auxiliary storage unit 103 generally stores a larger amount of data than the main storage unit 102. The communication control unit 104 is a network card or a wireless communication module. At least a part of the function for communication with other devices in the EMS 3 may be realized by the communication control unit 104. The input device 105 includes a keyboard, a mouse, a touch panel, a microphone for voice input, and the like. The output device 106 includes a display, a printer, and the like.

The auxiliary storage unit 103 stores a program 110 and data necessary for processing in advance. The program 110 causes the computer 100 to execute each functional element of the EMS 3. Each of the functional units 31 to 33 included in the EMS 3 is realized by loading the program 110 (operation support program) into the processor 101 and executing the program 110. In the present embodiment, each of the functional units 31 to 33 is configured in the EMS 3, but the functional units 31 to 33 may be configured in a distributed manner in a plurality of computers.

The program 110 causes the computer 100 to execute, for example, processing related to an operation support method using the EMS 3 serving as an operation support device. For example, the program 110 is read by the processor 101 or the main storage unit 102, and operates at least one of the processor 101, the main storage unit 102, the auxiliary storage unit 103, the communication control unit 104, the input device 105, and the output device 106. For example, by the program 110, data is read from and written into the main storage unit 102 and the auxiliary storage unit 103.

The program 110 may be provided after being recorded on a tangible storage medium, such as a CD-ROM, a DVD-ROM, or a semiconductor memory. The program 110 may be provided as a data signal through a communication network.

Referring again to FIG. 2, each functional part of the EMS 3 will be described. The acquisition unit 31 periodically acquires the SoC indicating the energy storage amount of the storage battery from the power storage system 23. The acquisition unit 31 stores the time-series SoC in the power storage system 23 in the history information DB 41 as history information. In the present embodiment, the energy storage amount in the power storage system is expressed as SoC, but may be expressed as the amount of power (unit: KWh).

The determination unit 32 determines the start of preparation for the operation of the load device when the history information indicating the history of the energy storage amount in the energy storage device corresponds to a predetermined state. In the present embodiment, the determination unit 32 determines the start of preparation for the operation of the methanation device 22 when the history information indicating the history of the SoC in the power storage system 23 corresponds to a predetermined state. The determination unit 32 performs the determination processing with reference to the history information stored in the history information DB 41.

The history information as a determination target includes at least a first value indicating the energy storage amount at a first point in time, which is one point in time before the current point in time, and a second value indicating the energy storage amount at at least one point in time before the first point in time.

Specifically, the first point in time may be the current point in time when the determination is performed, or may be a point in time before the current point in time. That is, the history information may include an SoC value at the first point in time, which is the current point in time or a point in time before the current point in time, and an SoC value at at least one point in time in the past before the first point in time.

In this manner, since not only the value of the energy storage amount at a predetermined point in time but also the value of the energy storage amount before that point in time is used to determine the start of operation preparation, the tendency of the transition of the energy storage amount is taken into consideration. Therefore, it is possible to accurately determine the start of operation preparation.

The determination unit 32 may make a start determination when the history information corresponds to a predetermined state in which the generation of surplus power in a predetermined range of power grid including at least a power generation device and an energy storage device is predicted.

Specifically, in the present embodiment, the determination unit 32 may make a start determination when the history information corresponds to a predetermined state in which the generation of surplus power in the microgrid 2 including the solar power generation system 21 and the power storage system 23 is predicted.

As described above, since the start of preparation for the operation of the load device is determined in advance of when the generation of surplus power is predicted, the generation of surplus power is prevented.

The determination unit 32 may make a start determination when the history information corresponds to a predetermined state in which the energy storage amount of the energy storage device is predicted to exceed a predetermined first threshold value. Specifically, in the present embodiment, the determination unit 32 may make a start determination when the history information corresponds to a predetermined state in which the SoC of the power storage system 23 is predicted to exceed the operational upper limit.

As described above, since the determination is made according to whether or not the energy storage amount is predicted to exceed the first threshold value, the generation of surplus power is predicted with high accuracy.

The output unit 33 outputs information indicating the start determination in a predetermined form. As an example, the output unit 33 may transmit information indicating the start determination to the load device as operation preparation start information for causing the load device to start operation preparation.

Specifically, in the present embodiment, the output unit 33 transmits the operation preparation start information to the methanation device 22 when the start determination has been performed by the determination unit 32. The methanation device 22 starts operation preparation upon receiving the operation preparation start information. The operation preparation is, for example, raising the temperature of the device. Therefore, the methanation device 22 can start operation with the consumption of the power generated by the solar power generation system 21 or the power discharged from the power storage system 23 when a predetermined period of time passes from the start of the operation preparation.

In addition, the output unit 33 may output information indicating the start determination in at least one form of a display and a sound that can be recognized by humans. Specifically, in the present embodiment, the output unit 33 may prompt the operator to perform an operation to start preparation for the operation of the methanation device 22 by using a monitor display visible to the operator of the methanation device 22, lighting of a lamp, notification by e-mail, alarm sound, and the like. As described above, since the information indicating the start determination is output in the form of display, sound, and the like, it is possible to prompt the operator of the load device to make a determination regarding activation.

Determination processing by the determination unit 32 according to the first embodiment will be described with reference to FIGS. 4 to 6. In the first embodiment, the determination unit 32 makes a start determination when the energy storage amount at the first point in time is equal to or greater than a predetermined second threshold value or when the energy storage amount at the first point in time is equal to or greater than a predetermined third threshold value and the energy storage amount at the first point in time has increased by a predetermined amount or more from that at the second point in time, which is a point in time set earlier than the first point in time by a predetermined time.

Figure 4:
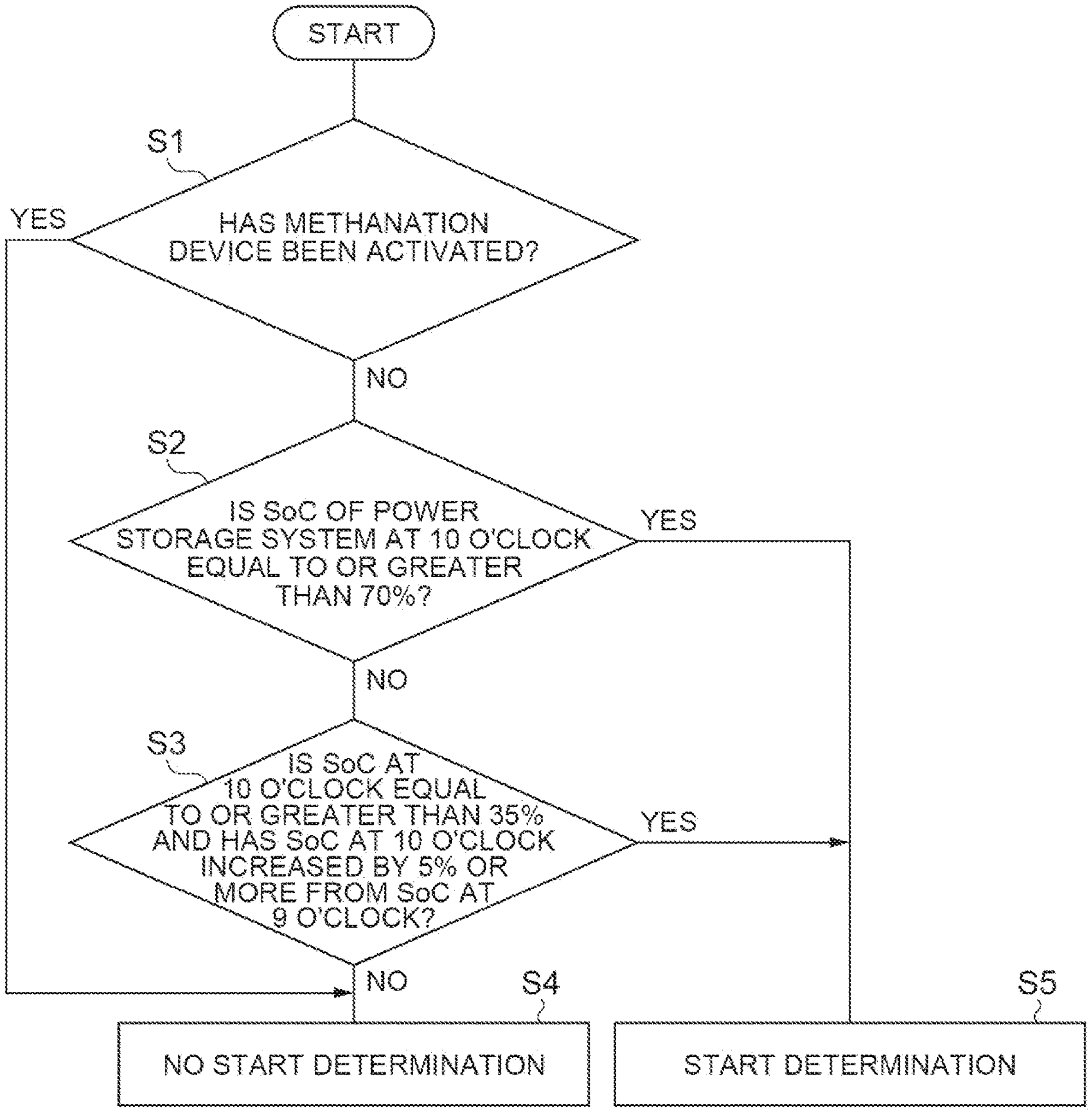
FIG. 4 is a flowchart showing determination processing of the operation support method according to the first embodiment.

FIG. 4 is a flowchart showing the determination processing of the operation support method according to the first embodiment. The determination processing shown in FIG. 4 may be performed at a predetermined time (for example, 10 o'clock) in one day. For example, in the case of solar power generation among renewable energy generations, the amount of generated power starts to increase at sunrise, reaches a peak during the day, and decreases toward sunset.

Considering such changes in SoC due to increases and decreases in the amount of generated power, operation start determination processing is performed at a predetermined time before the peak time so that the SoC in the power storage system 23 does not exceed the operational upper limit at the peak of the amount of generated power.

In step S1, the determination unit 32 acquires information indicating the operating state of the methanation device 22 through communication with the methanation device 22, and determines whether or not the methanation device 22 has been activated. When it is determined that the methanation device 22 has been activated, it is not necessary to determine the start of preparation for the operation of the methanation device. Therefore, the process proceeds to step S4. When it is not determined that the methanation device 22 has been activated, the process proceeds to step S2.

In step S2, the determination unit 32 determines whether or not the SoC of the power storage system 23 at 10 o'clock (current time; an example of the "first point in time") is equal to or greater than 70% (an example of the second threshold value). That is, at a point in time before the generated power in the microgrid 2 reaches its peak, it is determined whether or not the SoC is already in a relatively high state. In addition, the second threshold value used for the determination herein is not limited to 70%. When it is determined that the SoC is equal to or greater than 70%, the process proceeds to step S5. When it is not determined that the SoC is equal to or greater than 70%, the process proceeds to step S3.

In step S3, the determination unit 32 determines whether or not the SoC at 10 o'clock (first point in time) is equal to or greater than 35% (an example of the third threshold value) and the SoC at 10 o'clock has increased by 5% (predetermined degree) or more from the SoC at 9 o'clock (second point in time). That is, at a point in time before the generated power in the microgrid 2 reaches its peak, it is determined whether or not the SoC is higher than a predetermined level and is increasing by a predetermined level or more. In addition, the third threshold value, the second point in time, and the degree of increase used for the determination herein are not limited to 35%, 9 o'clock, and 5%, respectively.

When it is determined that the SoC at 10 o'clock is equal to or greater than 35% and has increased by 5% or more from the SoC at 9 o'clock, the process proceeds to step S5. On the other hand, when it is not determined that the SoC at 10 o'clock is equal to or greater than 35% and has increased by 5% or more from the SoC at 9 o'clock, the process proceeds to step S4.

Figure 5:
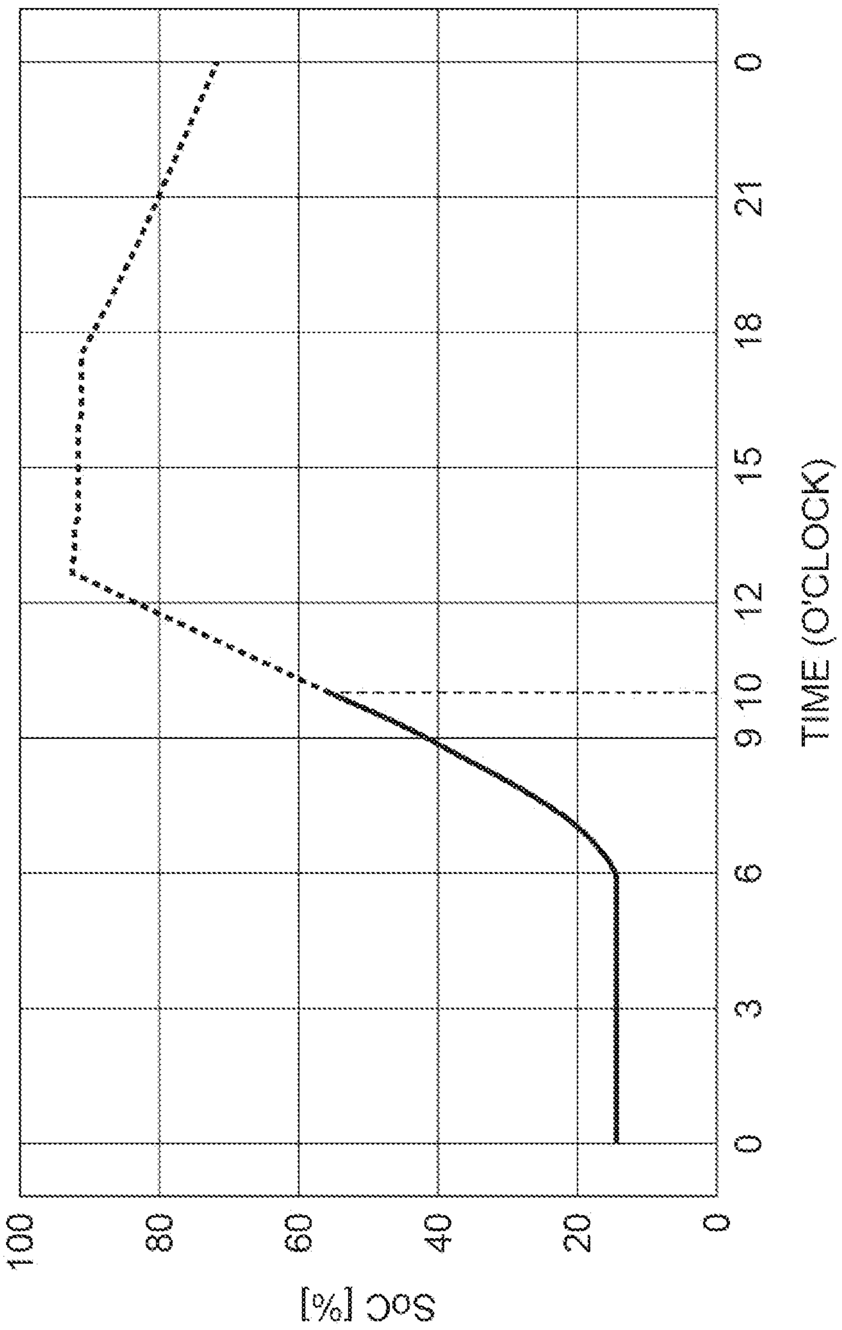
FIG. 5 is a diagram showing an example of SoC transition when a determination to start operation preparation is made.
Figure 6:
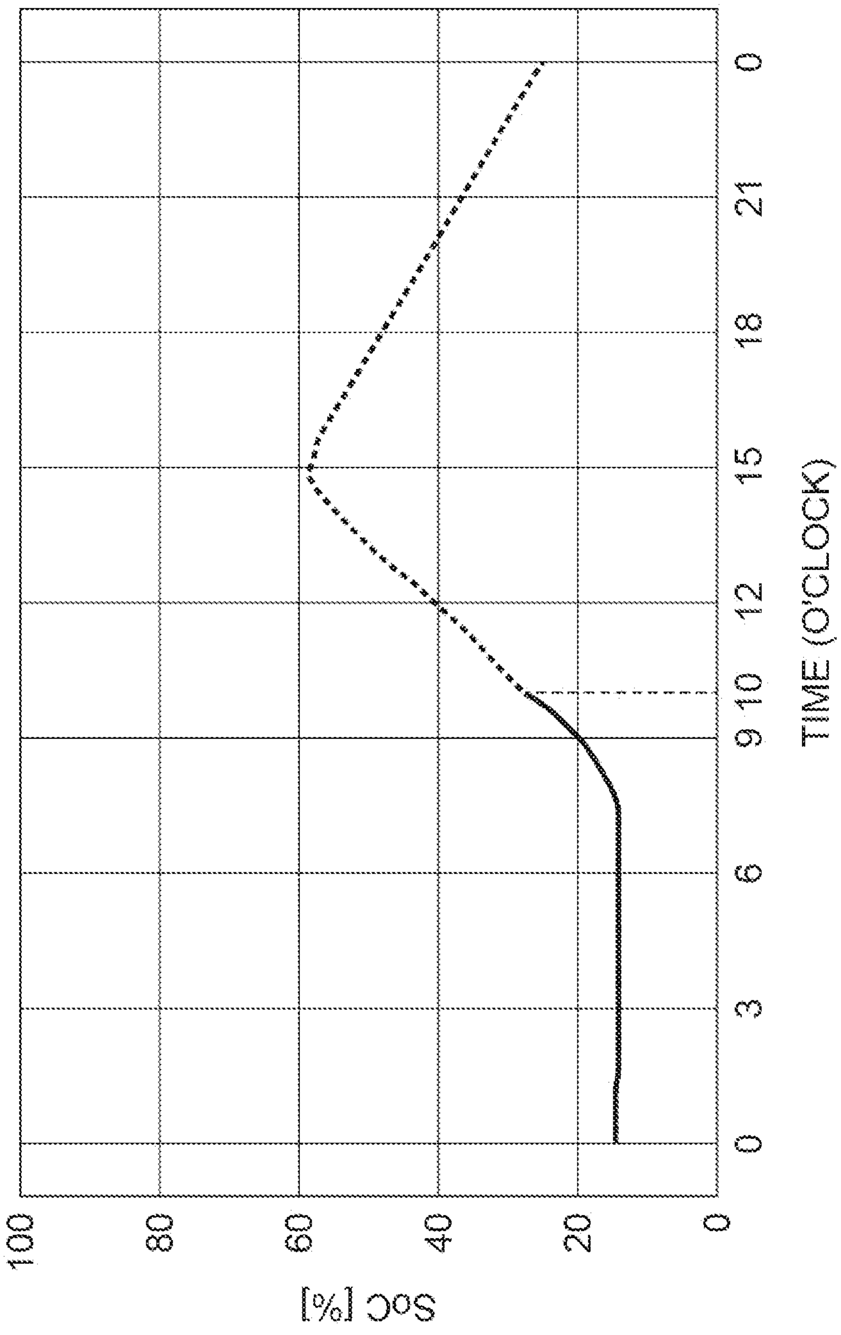
FIG. 6 is a diagram showing an example of SoC transition when a determination to start operation preparation is not made.

FIGS. 5 and 6 are diagrams showing examples of SoC transition. At 10 o'clock, the solid line portions of the SoC transitions shown in FIGS. 5 and 6 are stored in the history information DB 41 as history information. In the example shown in FIG. 5, the SoC indicated by the history information at 10 o'clock is approximately 50% at 10 o'clock, which is an increase of 5% or more compared with the value of approximately 40% at 9 o'clock. Therefore, the determination unit 32 determines that the process should proceed to step S5.

In the example shown in FIG. 6, the SoC indicated by the history information at 10 o'clock is approximately 30% at 10 o'clock. Therefore, the determination unit 32 determines that the process should proceed to step S4.

In step S4, the determination unit 32 does not make a start determination. On the other hand, in step S5, the determination unit 32 makes a start determination.

As described above, in the first embodiment, a start determination is made when the SoC at the first point in time is equal to or greater than the second threshold value or when the SoC at the first point in time is equal to or greater than the third threshold value and the rate of increase in the SoC in a predetermined period up to the first point in time is equal to or greater than a predetermined level. That is, not only the value of the energy storage amount at a predetermined point in time but also the tendency of increase in the energy storage amount is taken into consideration. Therefore, it is appropriately determined whether or not the generation of surplus power is predicted.

Figure 7:
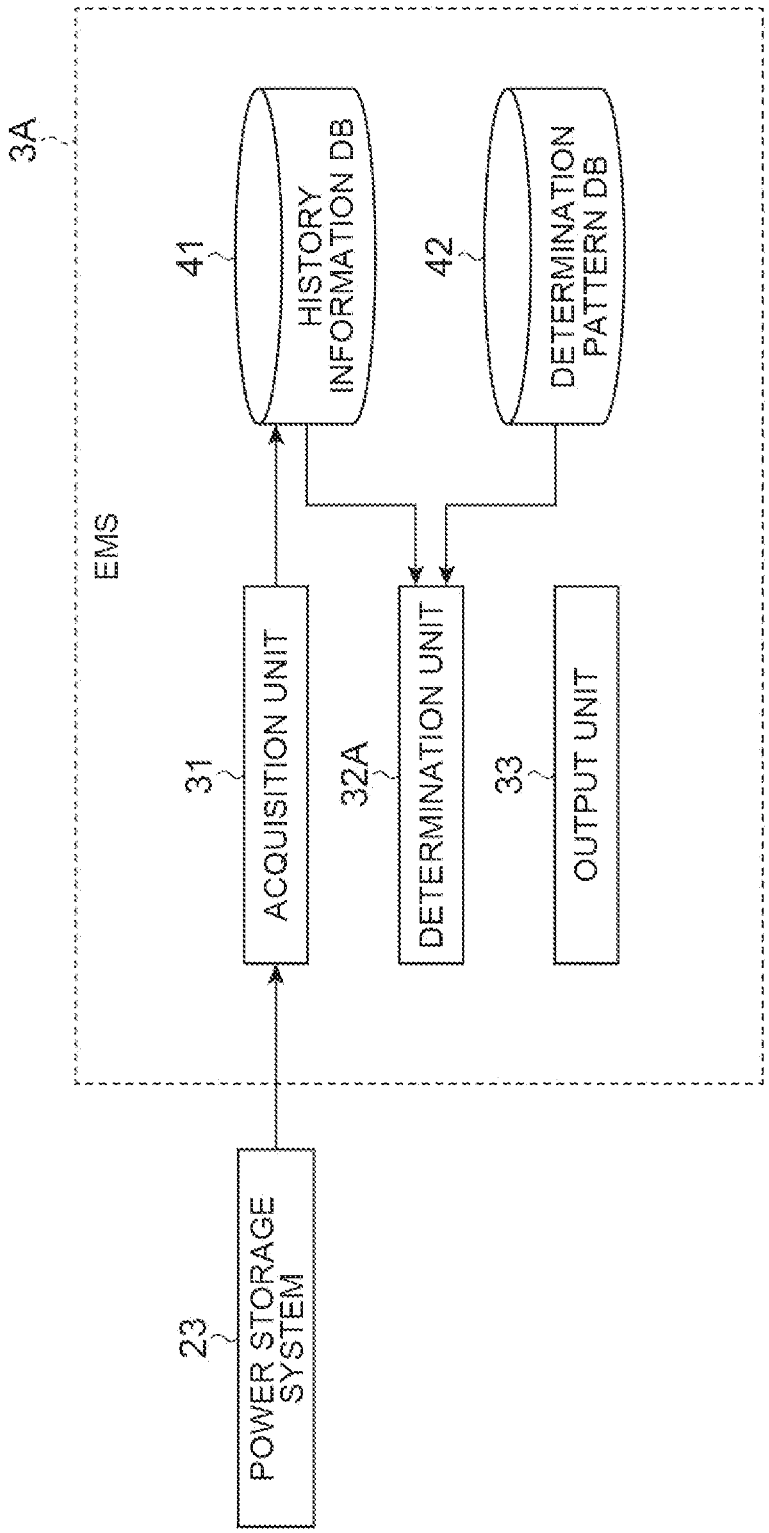
FIG. 7 is a block diagram showing the functional configuration of an EMS according to a second embodiment.

A determination unit 32 according to a second embodiment will be described with reference to FIGS. 7 to 11. FIG. 7 is a functional block diagram of an EMS according to the second embodiment. Compared with the EMS 3 shown in FIG. 2, an EMS 3A includes a determination unit 32A instead of the determination unit 32 and further includes a determination pattern DB 42.

In the second embodiment, the determination unit 32A makes a start determination when the transition of the energy storage amount during the time from the second point in time, which is a point in time set earlier than the first point in time by a predetermined time, to the first point in time corresponds to at least one surplus power generation pattern set in advance as an energy storage amount transition pattern in which the energy storage amount exceeds the first threshold value. The determination pattern DB 42 is a database in which the energy storage amount transition pattern is stored in advance.

Figure 8:
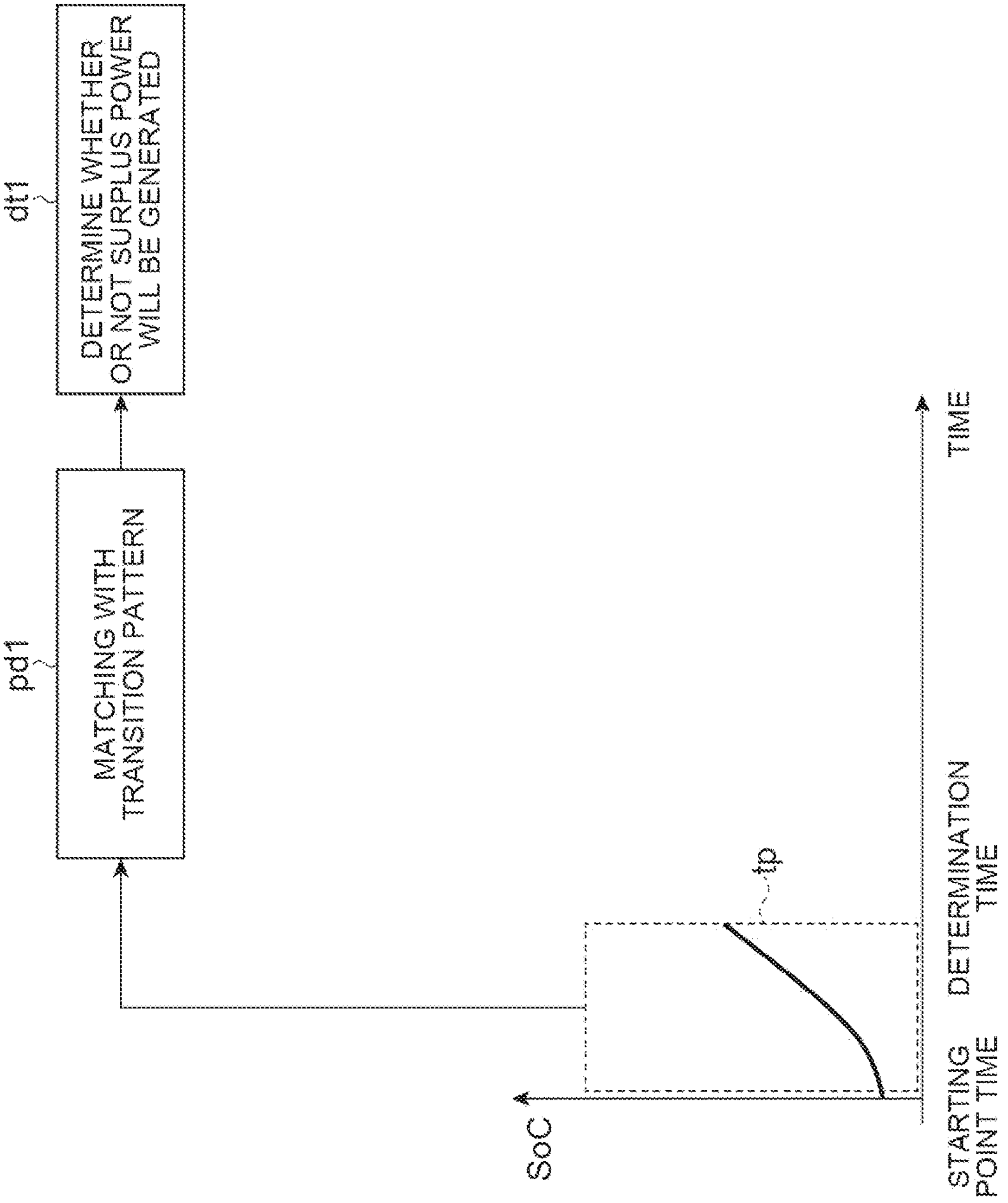
FIG. 8 is a diagram schematically showing determination processing in the second embodiment.

FIG. 8 is a diagram schematically showing determination processing in the second embodiment. The determination pattern DB 42 stores in advance a transition pattern tp that defines the transition of the SoC from a starting point time (an example of the second point in time) to a determination time (an example of the first point in time; for example, may be the current time). As indicated by the reference numeral pd1, the determination unit 32A performs a matching determination between the transition pattern tp and the SoC transition from the starting point time to the current time shown in the history information. Then, as indicated by the reference numeral dt1, the determination unit 32A determines, based on the result of the matching determination, whether or not surplus power will be generated in the microgrid 2 after the preparation time of the methanation device 22 has passed from the first point in time.

Figure 9A:
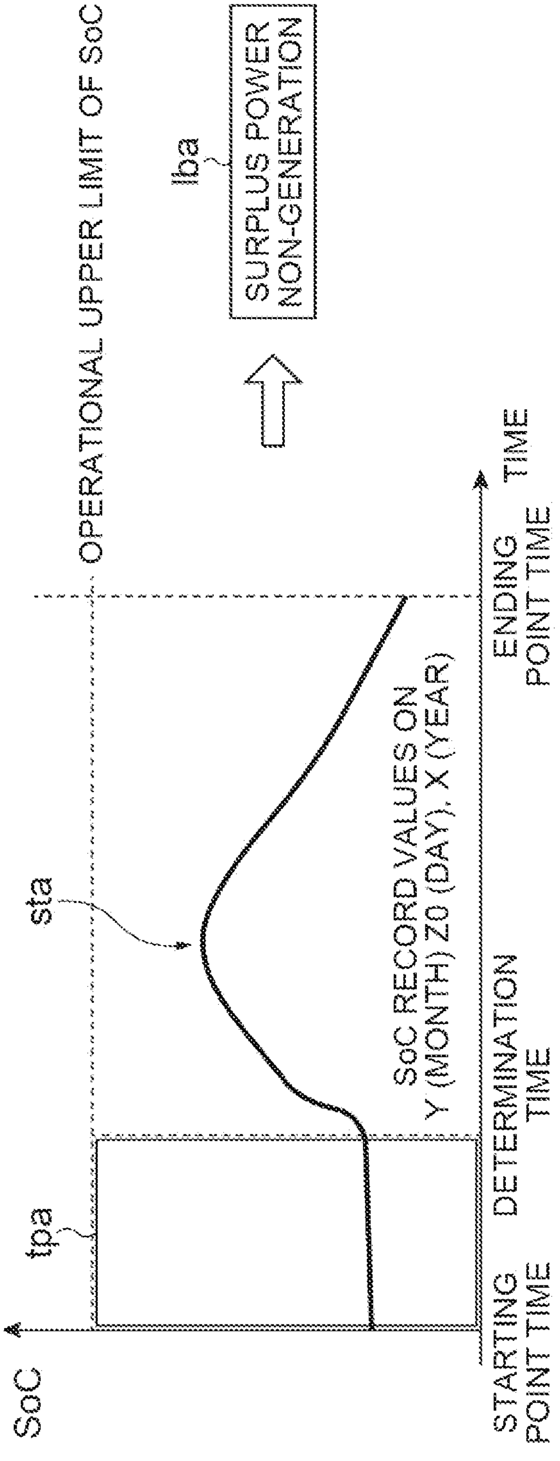
FIG. 9A is a diagram showing an example of a surplus power non-generation pattern among energy storage amount transition patterns.
Figure 9B:
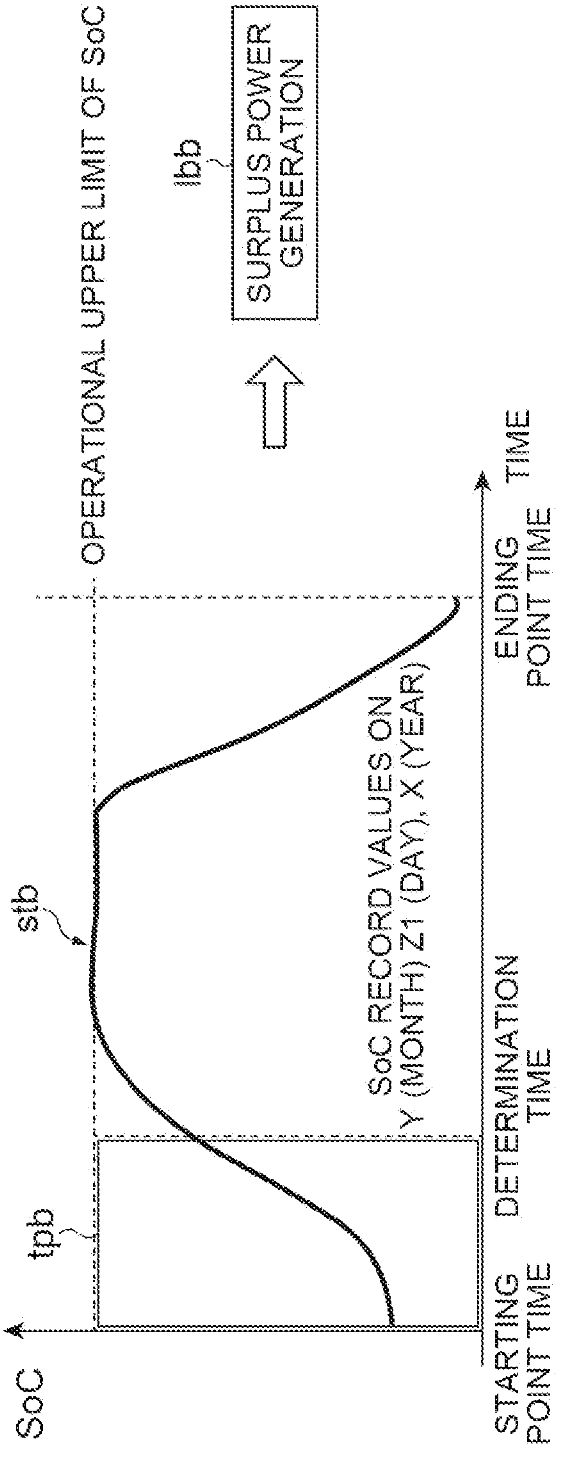
FIG. 9B is a diagram showing an example of a surplus power generation pattern among transition patterns of energy storage amount.

FIG. 9A and FIG. 9B are diagrams showing an example of the generation of the transition pattern tp. An SoC transition curve sta shown in FIG. 9A shows SoC transition records on Y (month) Z0 (day), X (year). In the transition curve sta, the SoC does not exceed the operational upper limit even at the peak time. Therefore, a portion of the transition curve sta from the starting point time to the determination time is set as a surplus power non-generation pattern tpa, which is a transition pattern in which no surplus power is generated, and the surplus power non-generation pattern tpa is stored in the determination pattern DB 42 in advance so as to be associated with a label lba indicating that no surplus power is generated.

An SoC transition curve stb shown in FIG. 9B shows SoC transition records on Y (month) Z1 (day), X (year). In the transition curve stb, the SoC exceeds the operational upper limit at the peak time. Therefore, a portion of the transition curve stb from the starting point time to the determination time is set as a surplus power generation pattern tpb, which is a transition pattern in which surplus power is generated, and the surplus power generation pattern tpb is stored in the determination pattern DB 42 in advance so as to be associated with a label lbb indicating that surplus power is generated.

In addition, the time from the determination time to the point in time at which the SoC in the transition curve stb reaches the operational upper limit needs to be longer than the preparation time of the methanation device 22 to which the EMS 3A according to the present embodiment is applied.

Figure 10:
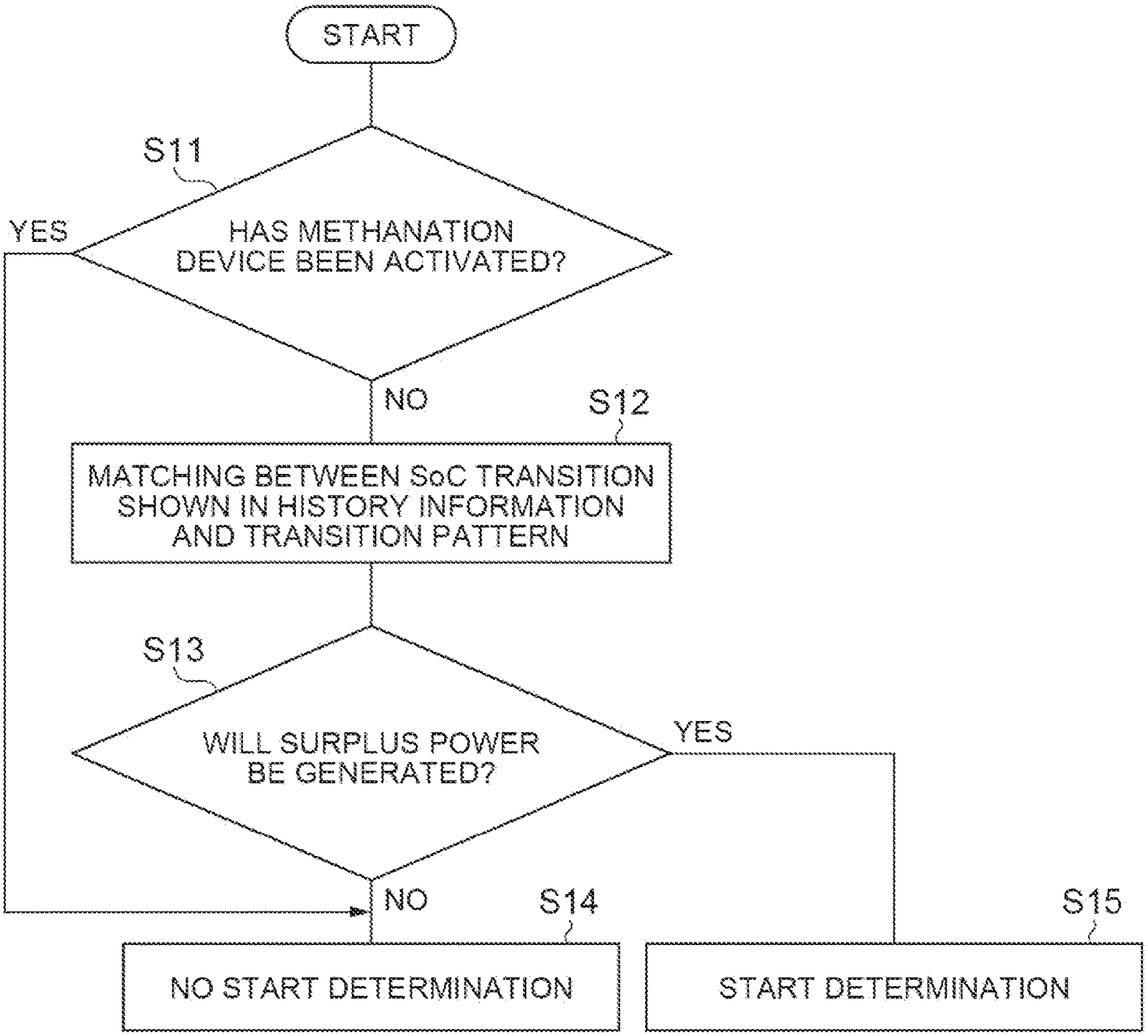
FIG. 10 is a flowchart showing determination processing of the operation support method according to the second embodiment.

FIG. 10 is a flowchart showing the determination processing of the operation support method according to the second embodiment. The determination processing shown in FIG. 10 may be performed at a predetermined time of the day, or may be performed at any time at predetermined time intervals.

In step S11, the determination unit 32A acquires information indicating the operating state of the methanation device 22 through communication with the methanation device 22, and determines whether or not the methanation device 22 has been activated. When it is determined that the methanation device 22 has been activated, it is not necessary to determine the start of preparation for the operation of the methanation device. Therefore, the process proceeds to step S14. When it is not determined that the methanation device 22 has been activated, the process proceeds to step S12.

In step S12, the determination unit 32A performs a matching determination between the transition pattern tp and the SoC transition from the starting point time to the current time shown in the history information. Specifically, the determination unit 32A may perform a matching determination by using the K-nearest neighbors algorithm in which the difference between each value of the SoC from the starting point time to the determination time shown in the history information and a value at each corresponding time of the transition pattern tp is set as the Euclidean distance.

As described above, the determination pattern DB 42 stores a plurality of transition patterns tp each of which is either the surplus power non-generation pattern tpa associated with the label lba indicating no surplus power generation or the surplus power generation pattern tpb associated with the label lbb indicating surplus power generation. Therefore, the determination unit 32A extracts a plurality of transition patterns tp similar to the transition shown in the history information by pattern matching, and counts the number of labels lba and the number of labels lbb associated with the extracted transition patterns tp.

In step S13, the determination unit 32A determines whether or not surplus power will be generated. Specifically, when the number of labels lbb indicating surplus power generation is larger than the number of labels lba indicating no surplus power generation as a result of label counting in step S12, the determination unit 32A may determine that surplus power will be generated. When it is not determined that surplus power will be generated, the process proceeds to step S14. On the other hand, when it is determined that surplus power will be generated, the process proceeds to step S15.

In step S14, the determination unit 32A does not make a start determination. On the other hand, in step S15, the determination unit 32A makes a start determination.

In addition, SoC record values for the transition pattern tp that are generated in advance and stored in the determination pattern DB 42 do not need to be SoC data from the starting point time to the ending point time, and may be, for example, SoC record values from the starting point time to a predetermined determination time. In addition, the transition pattern tp used for determination does not need to continuously include all SoC record values from the starting point time to the determination time, and may include, for example, SoC record values at three times of the starting point time, the determination time, and an intermediate time therebetween. In addition, the transition pattern tp used for determination may include record values at two points, for example, 9 o'clock and 10 o'clock, as in the first embodiment. In addition, the transition pattern tp used for determination does not need to include SoC record values, and may include values obtained by processing the SoC record values or may include the difference value between the SoC record values at the determination time and the starting point time and the SoC record value at the determination time.

Figure 11:
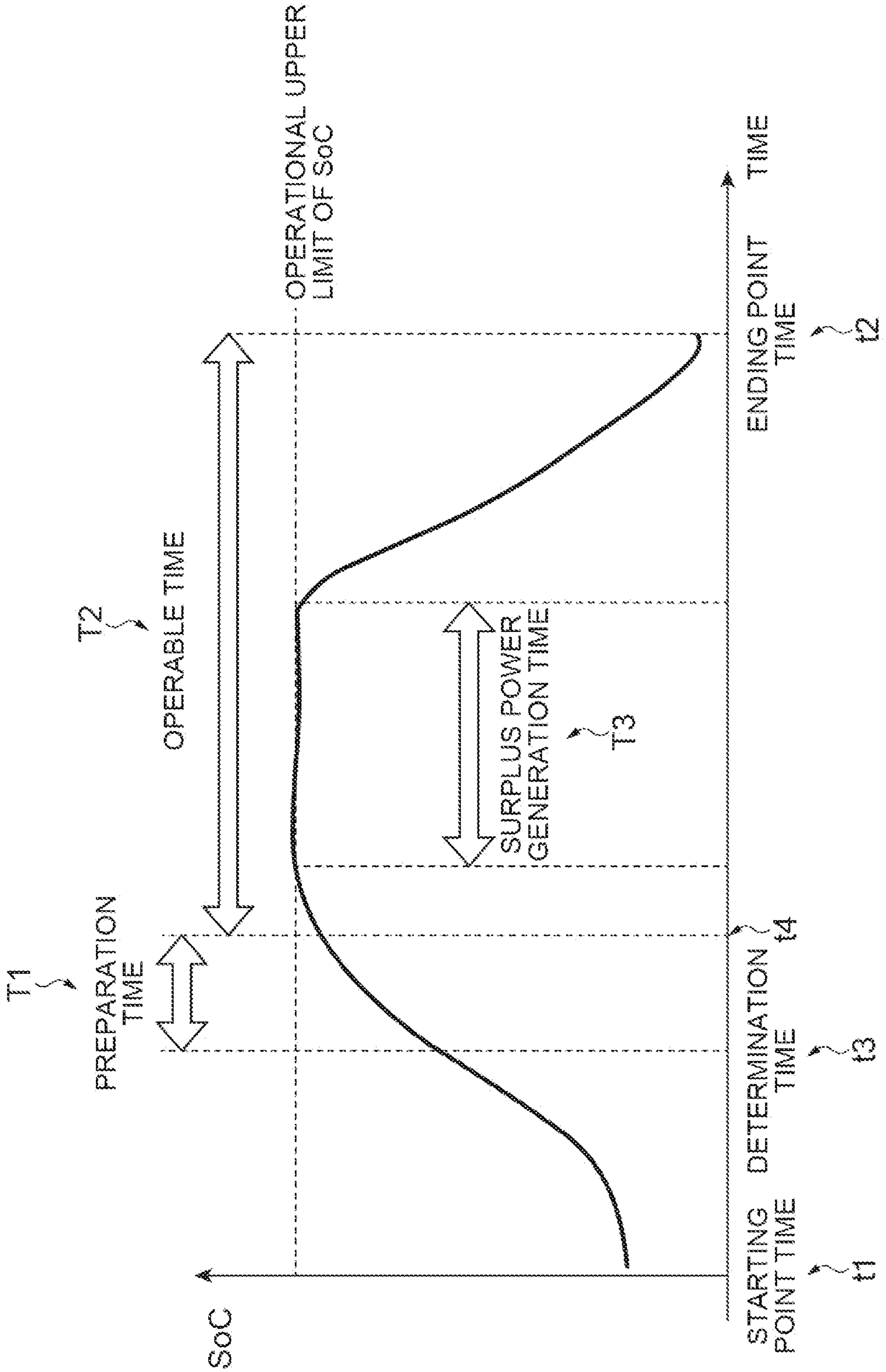
FIG. 11 is a diagram illustrating labeling regarding generation of surplus power for transition patterns.

Next, automatic labeling for the transition pattern tp will be described with reference to FIG. 11. Records information including SoC transition record values for generating the transition pattern tp includes, for example, record values from a predetermined starting point time t1 to an ending point time t2 in the operating time of the solar power generation system 21. The record values from the starting point time t1 to a determination time t3 form the transition pattern tp and are used for pattern matching, and the record values after the determination time t3 are used to determine whether or not the transition pattern tp corresponds to the surplus power generation pattern.

A preparation time T1 (for example, two hours) of a load device such as the methanation device 22 is set in advance, and the time from time t4, which is the time after the preparation time T1 has passed from the determination time t3, to the ending point time t2 is an operable time T2 when the preparation for the operation of the load device is started at time t3. Therefore, in automatic labeling for the transition pattern tp, when the total time during which the SoC record value is equal to or greater than (operational upper limit of SoC−δ) within the operable time T2 is equal to or longer than a predetermined time (for example, three hours), a label indicating surplus power generation may be associated with the transition pattern tp, and when the total time during which the SoC record value is equal to or greater than (SoC operational upper limit−δ) within the operable time T2 is less than the predetermined time, a label indicating no surplus power generation may be associated (δ is a setting parameter such as 1%). By such labeling, it is possible to prevent wasteful operations such as stopping the operation of the load device immediately because less surplus power is generated even though the load device has started operation preparation to start its operation. In addition, the labeling for the transition pattern may be automatically performed by a program, or may be performed by a person such as a microgrid operator.

Figure 12:
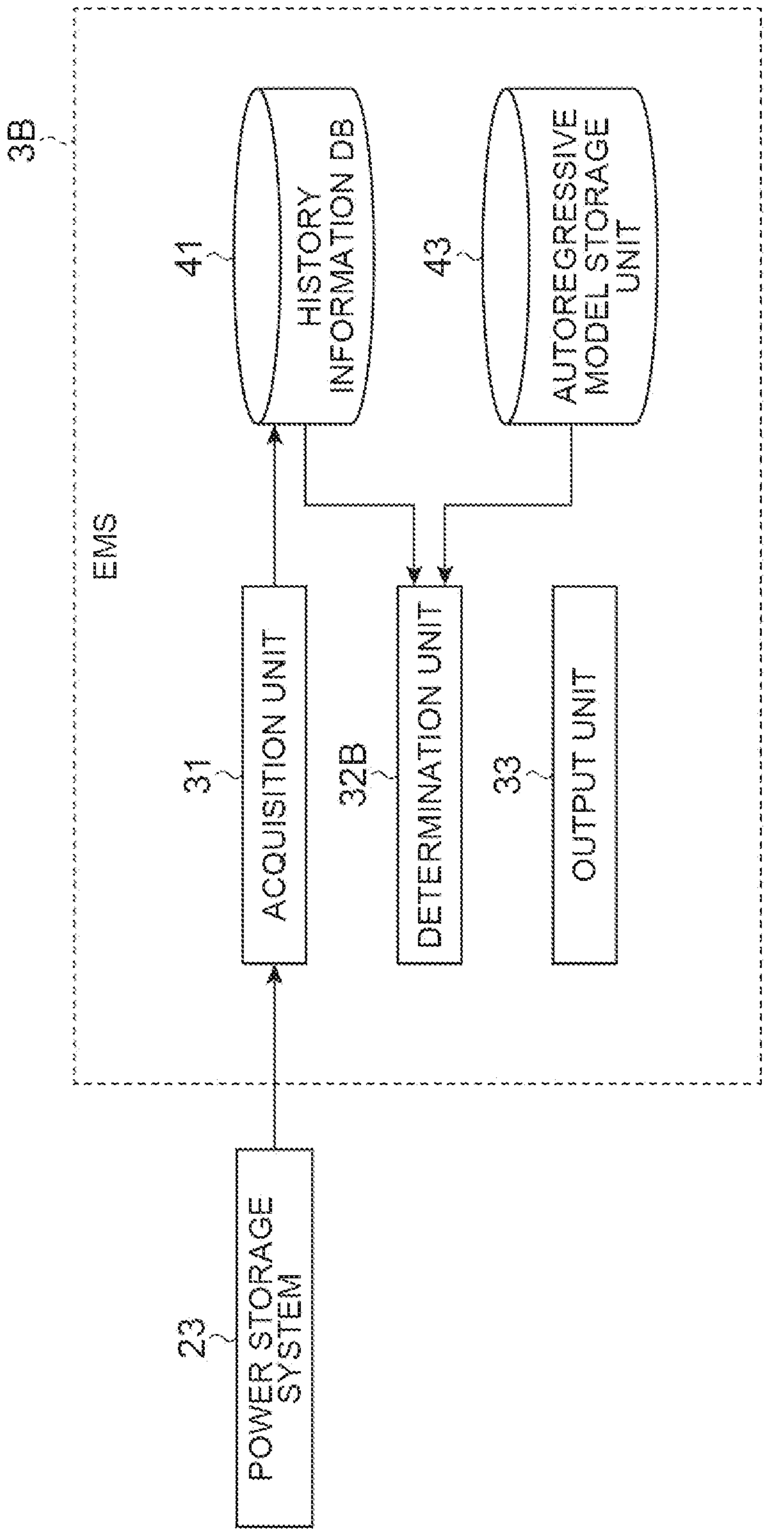
FIG. 12 is a block diagram showing the functional configuration of an EMS according to a third embodiment.

A determination unit according to a third embodiment will be described with reference to FIGS. 12 to 15. FIG. 12 is a functional block diagram of an EMS according to the third embodiment. Compared with the EMS 3 shown in FIG. 2, an EMS 3B includes a determination unit 32B instead of the determination unit 32 and further includes an autoregressive model storage unit 43.

In the third embodiment, the determination unit 32B calculates a predicted value of the energy storage amount after the current time in time series based on history information by using a predetermined prediction model constructed based on records information regarding the transition of the energy storage amount in the energy storage device, and makes a start determination when the predicted value within a predetermined prediction target period after the current time exceeds the first threshold value. The prediction model may be, for example, a predetermined autoregressive model. In the present embodiment, the determination unit 32B performs the start determination by using the autoregressive model. The autoregressive model storage unit 43 is a storage unit that stores in advance an autoregressive model for which learning and construction have been completed.

Figure 13:
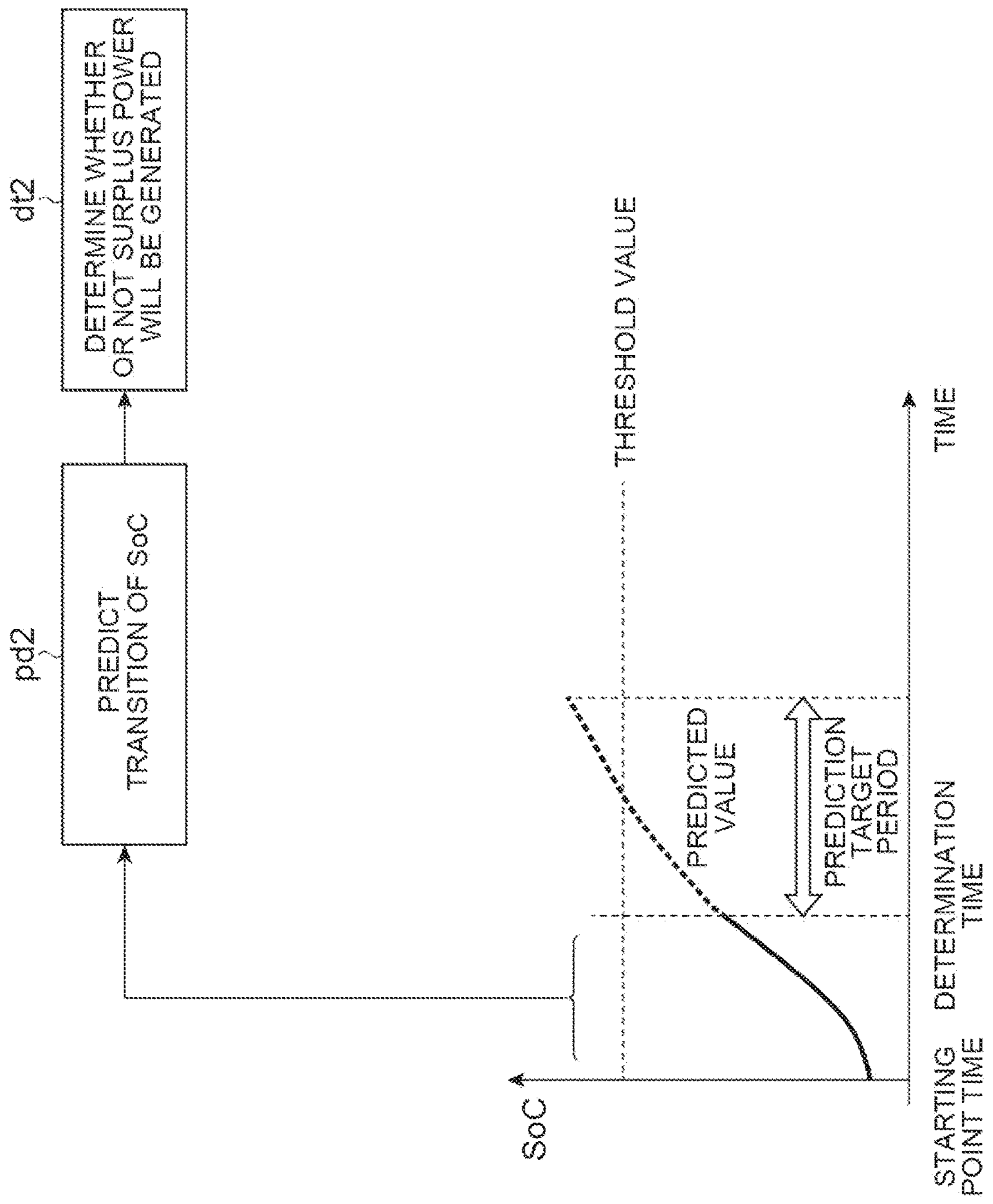
FIG. 13 is a diagram schematically showing determination processing in the third embodiment.

FIG. 13 is a diagram schematically showing determination processing in the third embodiment. In the third embodiment, as indicated by the reference numeral pd2, the determination unit 32B predicts a change in the SoC value of the storage battery of the power storage system 23 during the future prediction target period in a time-series analysis manner by using the record values of the SoC from the past before a predetermined time (for example, starting point time or five hours ago) to the determination time (for example, current time). In the third embodiment, an AR model (autoregressive model) is used as an example.

In addition, when the prediction target period is shorter than the preparation time of the load device, it is not possible to complete preparation for the operation of the load device before surplus power is generated. For this reason, the prediction target period needs to be longer than at least the preparation time of the load device.

Then, as indicated by the reference numeral dt2, the determination unit 32B determines that surplus power will be generated when the predicted value of the SoC in the prediction target period exceeds the first threshold value (for example, the operational upper limit of the SoC).

Figure 14:
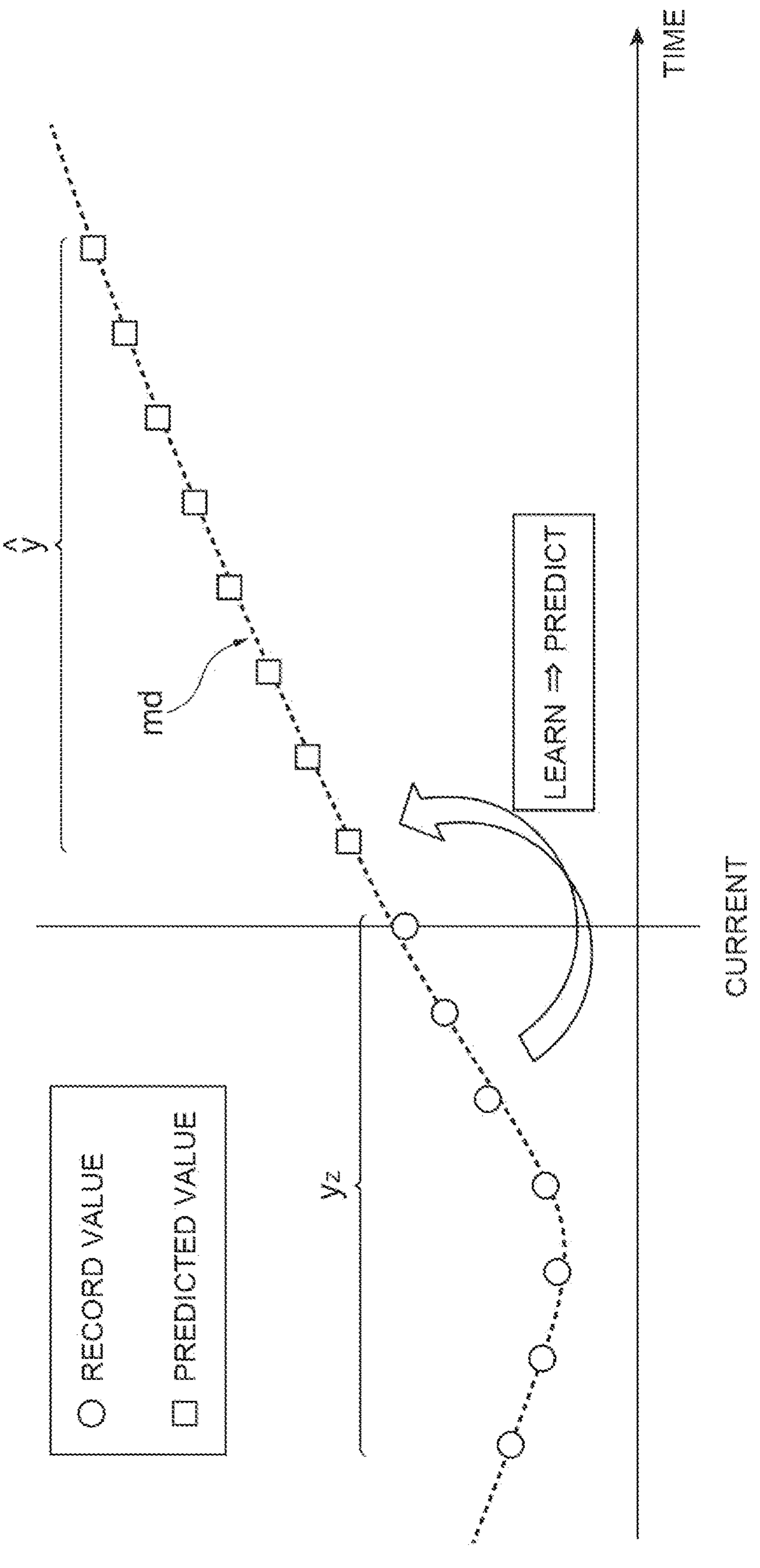
FIG. 14 is a diagram illustrating calculation of a predicted value of energy storage amount using an autoregressive model.

FIG. 14 is a diagram illustrating the calculation of a predicted value of the energy storage amount using an autoregressive model. The AR model is generated based on records information regarding the transition of the SoC of the storage battery. The generation of an AR model md will be described below.

When time-series data $\{y_i\}$ (i=1, . . . , N) including time-series SoC record values is given, the AR model md expresses the time-series data $y_i$ using the following equation.

$$y_n = \sum_{i=1}^{m} a_i y_{n-i} + v_n \quad \text{[Equation 1]}$$

Here, m is the order of autoregression, $a_i$ is a coefficient, and $v_n$ is white noise that follows a normal distribution with mean 0 and variance $\sigma^2$.

In the present embodiment, the order m and the coefficient $a_i$ (i=1, 2, . . . , m) of the AR model are determined so that the Akaike Information Criterion (AIC) is minimized for the record value $\{y_i\}$ (i=1, . . . , N) in the learning stage. The AIC is a type of statistic, and it can be interpreted that the smaller the AIC, the better "model with a good balance between model complexity and goodness of fit to data". The AIC of the AR model md with an order m is expressed by the following equation.

$$AIC = -2\ (\text{mximum log likelihood}) + 2\ (m+1)$$

The trained AR model md is stored in the autoregressive model storage unit 43, for example.

In the prediction stage, the determination unit 32B predicts the SoC in the prediction target period by using the obtained AR model md. $V_n$ in the AR model md is normally treated as zero. For example, the determination unit 32B calculates a predicted value $$\hat{y}_{n+1} \quad \text{[Equation 2]}$$

at the next time based on the following Equation using the record value $\{y_i\}$ (i=1, . . . , N).

$$\hat{y}_{n+1} = \sum_{i=1}^{m} a_i y_{n+1-i} \quad \text{[Equation 3]}$$

In addition, the determination unit 32B calculates a predicted value $$\hat{y}_{n+2} \quad \text{[Equation 4]}$$

at the next time using the following Equation.

$$\hat{y}_{n+2} = a_1 \hat{y}_{n+1} + \sum_{i=2}^{m} a_i y_{n+2-i} \quad \text{[Equation 5]}$$

The determination unit 32B repeatedly calculates predicted values in time series by using the predicted values at the previous time. In addition, in order to prevent the predicted value calculated by the AR model md from becoming too large or too small, the final predicted value may be limited within the range of the maximum value and minimum value designated by the user.

When the predicted value of the SoC in the prediction target period exceeds the first threshold value, the determination unit 32B determines that surplus power will be generated and makes a start determination. In addition, the determination unit 32B may also acquire the time at which the predicted value of the SoC is predicted to exceed the threshold value by using the AR model, and the output unit 33 may output the acquired time to present the acquired time to the user.

In addition, the determination unit 32B may acquire the start time and end time of the time, during which surplus power is generated due to the predicted value of the SoC exceeding the threshold value, by using the AR model md. The output unit 33 may output the start time and end time of surplus power generation in order to present the start time and end time of surplus power generation to the user.

Figure 15:
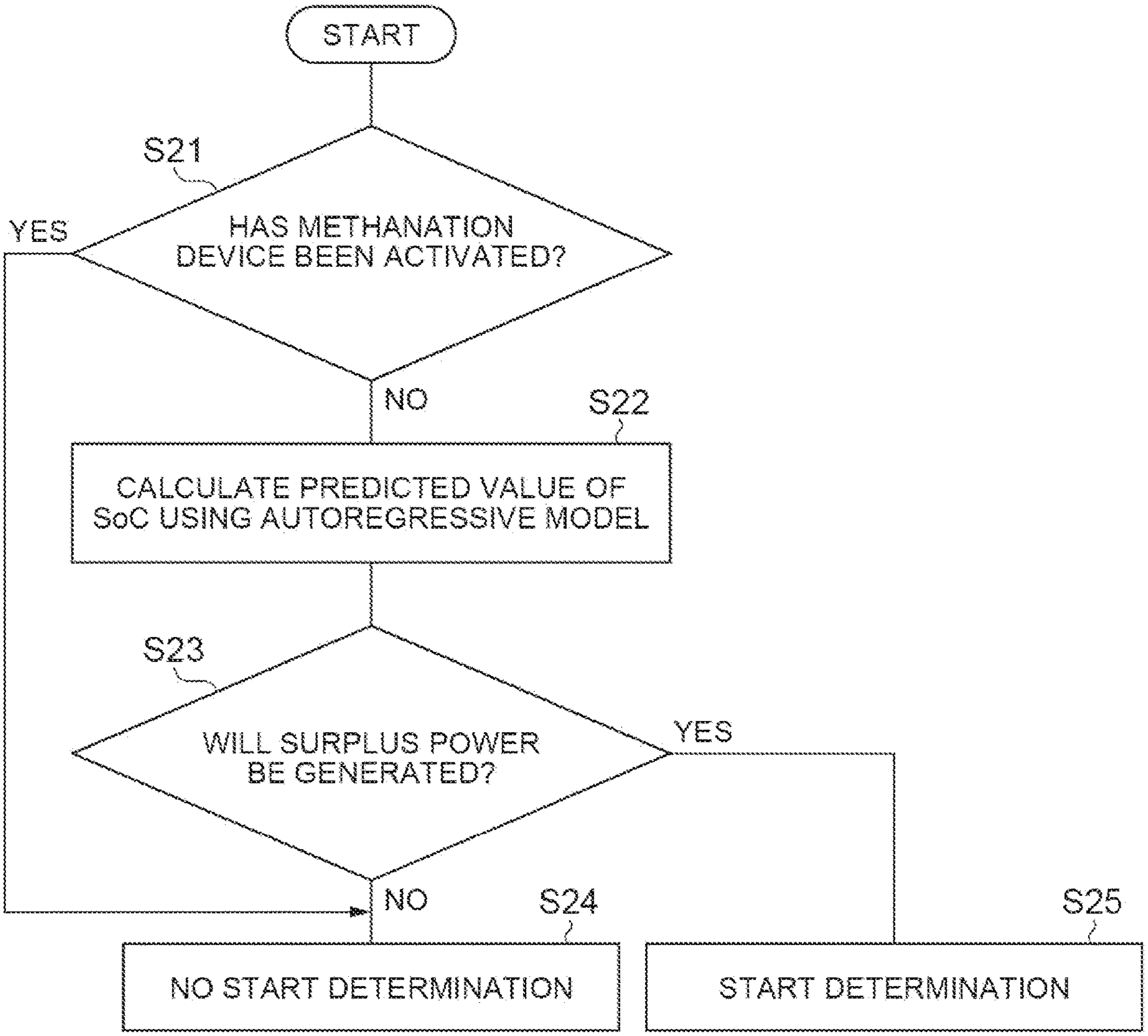
FIG. 15 is a flowchart showing determination processing of the operation support method according to the third embodiment.

FIG. 15 is a flowchart showing the determination processing of the operation support method according to the third embodiment. The determination processing shown in FIG. 15 may be performed at a predetermined time of the day, or may be performed at any time at predetermined time intervals.

In step S21, the determination unit 32B acquires information indicating the operating state of the methanation device 22 through communication with the methanation device 22, and determines whether or not the methanation device 22 has been activated. When it is determined that the methanation device 22 has been activated, it is not necessary to determine the start of preparation for the operation of the methanation device. Therefore, the process proceeds to step S24. When it is not determined that the methanation device 22 has been activated, the process proceeds to step S22.

In step S22, the determination unit 32B calculates a predicted value of the SoC in the prediction target period by using the autoregressive model md. As described above, the prediction target period is set to be longer than the preparation time of the methanation device 22.

In step S23, the determination unit 32B determines whether or not surplus power will be generated. That is, when the predicted value exceeds a predetermined first threshold value (for example, the operational upper limit of the SoC), the determination unit 32B determines that surplus power will be generated. When it is not determined that surplus power will be generated, the process proceeds to step S24. On the other hand, when it is determined that surplus power will be generated, the process proceeds to step S25.

In step S24, the determination unit 32B does not make a start determination. On the other hand, in step S25, the determination unit 32B makes a start determination.

In this manner, the SoC transition after the determination time (for example, the current time) is predicted by using the autoregressive model md for predicting the SoC transition, and the start of operation preparation is determined when the predicted value of the SoC within the prediction target period exceeds a predetermined threshold value. Therefore, it is possible to easily predict the generation of surplus power and determine the start of operation preparation.

According to the EMSs 3, 3A, and 3B (operation support devices), the operation support methods, and the operation support programs of the present embodiment described above, when the history information of the SoC corresponds to a predetermined state, a determination is made to start preparation for the operation of the methanation device 22 (load device), which requires a preparation time before reaching an operation state in which power can be consumed. Therefore, by performing the processing for determining the start of operation preparation in advance at an appropriate timing, it is possible to bring the load device into an operation state in which power can be consumed at a desired timing.

In addition, the operation support device according to the present embodiment does not require a predicted value of power generated by renewable energy, such as solar power, or a predicted value of power demand in the start determination processing. When using the predicted values of generated power and power demand, if the predictions are incorrect, the operation plan for the power generation system and the load device becomes inappropriate. The operation support device according to the present embodiment prevents the operation plan from becoming inappropriate due to incorrectness of these predicted values.

In addition, using the predicted values of generated power and power demand requires a lot of cost. For example, in order to predict the power obtained by solar power generation, weather forecast data including the amount of solar radiation is required, and the provision of weather forecast data is often a paid service. In addition, initial costs and maintenance costs for computational resources and communication facilities for predicting generated power and power demand are required. In the operation support device according to the present embodiment, these costs are not required.

Up to now, the present disclosure has been described in detail through the embodiments thereof. However, the present disclosure is not limited to the embodiments described above. The present disclosure can be modified in various ways without departing from the gist thereof.

In the second and third embodiments, the determination units 32A and 32B may perform the determination processing at predetermined time intervals Δt. In this case, when the time at which surplus power is predicted to be generated is after the time (preparation time for operation of load device+Δt) has passed from the current time, the determination units 32A and 32B may not make a start determination. In this case, since the prediction accuracy may be low because the time at which surplus power is predicted to be generated is far in the future from the current time, it is possible to prevent an operation start determination based on low-accuracy prediction. In addition, even if the start determination is postponed at this point in time, preparation for the operation of the load device can be completed by the time at which surplus power is generated by performing the start determination based on the next determination to be performed after the time Δt has passed from the current time.

In addition, although the methanation device 22 is illustrated as an example of a load device in the present embodiment, the load device is not limited to the methanation device 22. For example, the load device may be a hydrogen production system that produces hydrogen by water electrolysis. In general, the higher the temperature, the lower the theoretical electrolysis voltage, and the higher the efficiency of water electrolysis. Some hydrogen production systems, such as steam water electrolysis to electrolyze high-temperature steam, require time to prepare for operation. In addition, the load device may be a device for producing olefins (ethylene, propylene) that are raw materials for resins and plastics without being limited to hydrogen and methane. In addition, the load device may be an electric boiler. In addition, the load device may be an electric furnace for melting scrap iron, or may be an electrolytic/electro-refining device for producing crude iron from iron ore. In addition, the load device may be a chemical processing device, a plastic processing device such as a rolling device, a food processing device, a distillation device, or a heat treatment furnace such as a surface heat treatment device. These devices that require heat energy are often devices that require time to prepare for operation, such as raising the temperature and raising the pressure. When a warm pipe is required to prevent water hammer from occurring in steam pipes and the like, that time may also be included in the preparation time. When the load device is a device that requires purge work to replace toxic gas in the tank with nitrogen or air before the start of operation, the time for that work may also be included in the preparation time. When the load device is a device that requires water supply work before activation, the time for water supply may also be included in the preparation time. When the load device is a device that requires a worker to monitor the device on-site during activation for safety and legal reasons, the worker's travel time may be included in the preparation time. Work, such as start-up inspections (checking the residual pressure, checking opening and closing of cocks and the like, visual inspection to ensure that no water leaks have occurred, and checking the water level gauge) and recording performed before device operation may also be included in the preparation time. The time for cooling the device and lowering the pressure may also be included in the preparation time. The time required to prepare for the operation of an auxiliary machine, instead of the load device itself, for example, a storage device for products manufactured by the load device may also be included in the preparation time.

In the embodiments described above, the preparation time of the load device is set by the user, but may be set by other means. For example, as the preparation time, the time required to reach the desired temperature may be automatically calculated by the EMS using numerical expressions, tables, functions, statistical models created in advance, and the like by using information such as the temperature of the load device and the outside temperature before the start of operation preparation.

In the embodiments described above, the microgrid 2 includes one power storage system 23 and one storage battery, but there may be a plurality of power storage systems 23. In this case, the total SoC may be calculated by regarding all of the plurality of power storage systems 23 as one storage battery. In addition, the total SoC may be calculated by excluding a storage battery that is out of order or out of operation among the plurality of power storage systems 23 and storage batteries. When there are the same number of load devices and power storage systems 23, one load device may be assigned to one power storage system 23.

Figure 16:
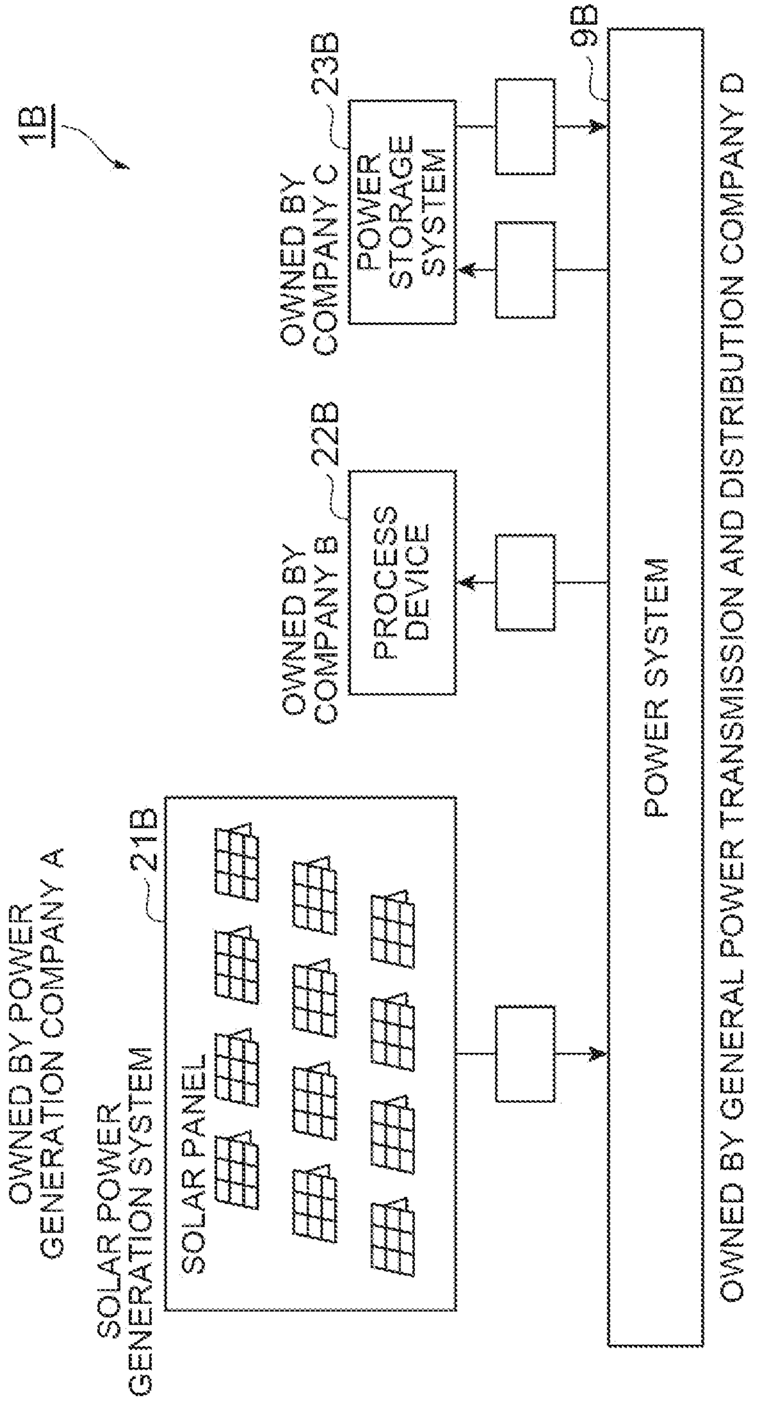
FIG. 16 is a schematic diagram showing another example of the power supply system.

In addition, in the present embodiment, as shown in FIG. 1, all of the solar power generation system 21 (power generation facility using renewable energy), the power storage system 23, and the methanation device 22 (load device) are present in one microgrid 2. However, the present disclosure is not limited to such a form. FIG. 16 is a schematic diagram showing another example of the power supply system. A system to which the operation support devices 3, 3A, and 3B according to the present embodiment are applied may be a power supply system 1B in which each facility has a virtual connection through a power system owned by the general power transmission and distribution company, as shown in FIG. 16. That is, the operation support devices 3, 3A, and 3B may be applied by regarding a group of devices having the connection form shown in FIG. 16 as a virtual microgrid. The power supply system 1B includes a solar power generation system 21B owned by a power generation company A, a process device 22B (an example of a load device) owned by a company B, and a power storage system 23B owned by a company C. The solar power generation system 21B, the process device 22B, and the power storage system 23B are connected to each other through a power system 9B. That is, companies that own the respective systems may be different. In this case, the contract between the companies may be a transaction through the electricity market or a bilateral transaction.

Renewable energy is not limited to solar power. In the case of solar power generation, the SoC history information, records information, and the like can be information about the time from before sunrise (starting point time) to after sunset (ending point time) in one day. On the other hand, in the case of wind power generation, there is no limitation on a unit such as one day, unlike in the case of solar power generation. Based on records information that is information indicating the continuous transition of the SoC, it is possible to predict the generation of surplus power within a predetermined time (four hours) after the determination time, for example, by setting the time before a predetermined time (for example, one hour) from the determination time as a starting point time for a set of SoC record values from the starting point time to the ending point time, where the interval between the starting point time and the ending point time is a predetermined time (for example, five hours). In this manner, the example of the transition pattern shown in the second embodiment can be applied not only to solar power generation but also to wind power generation and the like.

In the K-nearest neighbors algorithm in the second embodiment, the similarity is defined as the Euclidean distance of the difference between the SoC transition and the transition pattern shown in the history information. However, the similarity may be calculated by using other information. For example, each transition pattern may be associated with a flag that is 1 when the pattern is based on the record values of weekdays (working days) and 0 when the pattern is based on the record values of holidays and public holidays (non-working days), and a difference between the flag of the transition pattern and the attribute flag of history information to be determined (a flag indicating whether or not the determination time is a weekday) may be included in calculating the Euclidean distance. In addition to the Euclidean distance, a distance calculation method such as the L1 norm may be applied.

In the second embodiment, the K-nearest neighbors algorithm is used as an example, but other algorithms may be used. For example, other statistical methods may be used, such as linear fractional analysis, logistic regression, naive Bayes classifiers, decision trees, random forests, neural networks, and support vector machines.

In the third embodiment, prediction is performed by using the AR model, but the model applied to prediction is not limited to the AR model. Neighborhood data may be extracted by using the K-nearest neighbors algorithm used in the second embodiment, and a future predicted value may be calculated by using the average value and median value of the neighborhood data (from determination time to ending point time). In addition, other mathematical models (machine learning models and deep learning models), such as a moving average (MA) model, an autoregressive moving average (ARMA) model, an autoregressive integrated moving average (ARIMA) model, a Holt-Winters model, a gradient boosting decision tree (GBDT) model, a long short-term memory (LSTM) model, and a gated recurrent unit (GRU) model, may be used. In addition, instead of the estimation/prediction method using the AIC minimum model, other methods, for example, estimation/prediction methods using a Kalman filter may be used.

In addition, the location where the computer forming the EMS is installed is not limited to the inside of the microgrid 2 or the vicinity of the microgrid 2, but may be remote or may be in a so-called cloud.

In the present embodiment, the microgrid 2 is assumed as a power network of a predetermined range including a power generation device and an energy storage device, but the form is not limited to a single factory, a single office, and the like. For example, a factory complex where a plurality of factories are gathered may be used.

In addition, in the present embodiment, a case is assumed in which, even if an operation is performed to prepare for the operation of the load device, the effect on the storage amount of the power storage system is negligible, that is, the rating of the load device is small relative to the capacity of the storage battery. However, when the preparation for the operation of the load device has a non-negligible effect on the storage amount of the power storage system, it is possible to devise a method for labeling of surplus power generation or surplus power non-generation associated with the transition pattern in the second embodiment. Specifically, in a case where the load device is operating and a case where the load device is not operating from the determination time to the ending point time, two threshold values for predicting the generation of surplus power are set. That is, when the load device is not operating, the threshold value is set to the operational upper limit of the SoC, and when the load device is operating, the threshold value is set to a lower value (for example, operational upper limit of the SoC-10%). By setting like this, it is possible to perform labeling that indicates whether or not surplus power will be generated, taking into consideration the influence of the operation itself of the load device.

[Supplementary Notes]

The present disclosure relates to a technique for operating production equipment by effectively utilizing surplus power from renewable energy. Therefore, the present disclosure contributes to the following goals of the Sustainable Development Goals (SDGs) led by the United Nations.

Goal 7: "Ensure access to affordable, reliable, and sustainable modern energy for all"

Goal 9: "Build resilient infrastructure, promote inclusive and sustainable industrialization, and promote innovation"

Hereinafter, the gist of the present disclosure will be described.

[1] An operation support device for making a start determination regarding preparation for an operation of a load device, including: a determination unit that makes a start determination regarding preparation for an operation of the load device when history information indicating a history of an energy storage amount in an energy storage device corresponds to a predetermined state, wherein the load device is a device that requires a preparation time from start of operation preparation to start of operation, and can consume during operation at least one of power generated by a power generation device using renewable energy and discharged power of the energy storage device that can store power generated by the power generation device.

[2] The operation support device according to [1], wherein the history information includes a first value indicating the energy storage amount at a first point in time, which is a point in time before current time, and a second value indicating the energy storage amount at at least one point in time before the first point in time.

[3] The operation support device according to claim [2], wherein the determination unit makes the start determination when the history information corresponds to a predetermined state in which surplus power is predicted to be generated in a predetermined range of power grid including at least the power generation device and the energy storage device.

[4] The operation support device according to claim [3], wherein the determination unit makes the start determination when the history information corresponds to a predetermined state in which the energy storage amount of the energy storage device is predicted to exceed a predetermined first threshold value.

[5] The operation support device according to claim [4], wherein the determination unit makes the start determination when the energy storage amount at the first point in time is equal to or greater than a predetermined second threshold value or when the energy storage amount at the first point in time is equal to or greater than a predetermined third threshold value and the energy storage amount at the first point in time has increased by a predetermined amount or more from that at a second point in time, which is a point in time set earlier than the first point in time by a predetermined time.

[6] The operation support device according to claim [4], wherein the determination unit makes the start determination when a transition of the energy storage amount during a time from a second point in time, which is a point in time set earlier than the first point in time by a predetermined time, to the first point in time corresponds to at least one surplus power generation pattern set in advance as an energy storage amount transition pattern in which the energy storage amount exceeds the first threshold value.

[7] The operation support device according to claim [4], wherein the determination unit calculates a predicted value of the energy storage amount after current time in time series based on the history information by using a predetermined prediction model constructed based on records information regarding a transition of the energy storage amount in the energy storage device, and makes the start determination when the predicted value within a predetermined prediction target period after the current time exceeds the first threshold value.

[8] The operation support device according to any one of [1] to [7], wherein the determination unit performs the start determination when the operation of the load device has not started.

[9] The operation support device according to [1] to [8], further including: an output unit that outputs information indicating the start determination in a predetermined form.

[10] The operation support device according to [9], wherein the output unit transmits the information indicating the start determination to the load device as operation preparation start information for causing the load device to start operation preparation.

[11] The operation support device according to [9], wherein the output unit outputs the information indicating the start determination in at least one form of a display and a sound recognizable by humans.

[12] An operation support method in an operation support device for making a start determination regarding preparation for an operation of a load device, including: making a start determination regarding preparation for an operation of the load device when history information indicating a history of an energy storage amount in an energy storage device corresponds to a predetermined state, wherein the load device is a device that requires a preparation time from start of operation preparation to start of operation, and can consume during operation at least one of power generated by a power generation device using renewable energy and discharged power of the energy storage device that can store power generated by the power generation device.

[13] An operation support program causing a computer to function as an operation support device for making a start determination regarding preparation for an operation of a load device, the program causing the computer to realize: a determination function for making a start determination regarding preparation for an operation of the load device when history information indicating a history of an energy storage amount in an energy storage device corresponds to a predetermined state, wherein the load device is a device that requires a preparation time from start of operation preparation to start of operation, and can consume during operation at least one of power generated by a power generation device using renewable energy and discharged power of the energy storage device that can store power generated by the power generation device.

REFERENCE SIGNS LIST

1: power supply system, 2: microgrid, 3: energy management system (EMS), 21: solar power generation system, 21*a*: solar panel, 22: methanation device, 23: power storage system, 24: connection unit, 25: received power measurement unit, 26: transmitted power measurement unit, 31: acquisition unit, 32, 32A, 32B: determination unit, 33: output unit, 41: history information DB, 42: determination pattern DB, 43: autoregressive model storage unit, 90: power system.

What is claimed is:

1. An operation support device for making a start determination regarding preparation for an operation of a load device, comprising:

a determination unit that makes a start determination regarding preparation for an operation of the load device when history information indicating a history of an energy storage amount in an energy storage device corresponds to a predetermined state, wherein the load device is a device that requires a preparation time from start of operation preparation to start of operation, and consumes during operation at least one of power generated by a power generation device using renewable energy and discharged power of the energy storage device that stores power generated by the power generation device, wherein the history information includes a first value indicating the energy storage amount at a first point in time, which is a point in time before current time, and a second value indicating the energy storage amount at at least one point in time before the first point in time, wherein the predetermined state is a state in which surplus power is predicted to be generated in a predetermined range of power grid including at least the power generation device and the energy storage device, and in which the energy storage amount of the energy storage device is predicted to exceed a predetermined first threshold value, and wherein the determination unit calculates a predicted value of the energy storage amount after the current time in time series based on the history information by using a predetermined prediction model constructed based on records information regarding a transition of the energy storage amount in the energy storage device, and makes the start determination when the predicted value within a predetermined prediction target period after the current time exceeds the first threshold value.

2. The operation support device according to claim 1, wherein the determination unit makes the start determination when the energy storage amount at the first point in time is equal to or greater than a predetermined second threshold value or when the energy storage amount at the first point in time is equal to or greater than a predetermined third threshold value and the energy storage amount at the first point in time has increased by a predetermined amount or more from that at a second point in time, which is a point in time set earlier than the first point in time by a predetermined time.

3. The operation support device according to claim 1, wherein the determination unit makes the start determination when the transition of the energy storage amount during a time from a second point in time, which is a point in time set earlier than the first point in time by a predetermined time, to the first point in time corresponds to at least one surplus power generation pattern set in advance as an energy storage amount transition pattern in which the energy storage amount exceeds the first threshold value.

4. The operation support device according to claim 1, wherein the determination unit performs the start determination when the operation of the load device has not started.

5. The operation support device according to claim 1, further comprising:

an output unit that outputs information indicating the start determination in a predetermined form.

6. The operation support device according to claim 5, wherein the output unit transmits the information indicating the start determination to the load device as operation preparation start information for causing the load device to start operation preparation.

7. The operation support device according to claim 5, wherein the output unit outputs the information indicating the start determination in at least one form of a display and a sound recognizable by humans.

8. An operation support method in an operation support device for making a start determination regarding preparation for an operation of a load device, comprising:

calculating a predicted value of an energy storage amount in an energy storage device after current time in time series based on history information indicating a history of the energy storage amount in the energy storage device by using a predetermined prediction model constructed based on records information regarding a transition of the energy storage amount in the energy storage device, and making a start determination regarding preparation for an operation of the load device when the history information corresponds to a predetermined state, and when the predicted value within a predetermined prediction target period after the current time exceeds a predetermined first threshold value, wherein the load device is a device that requires a preparation time from start of operation preparation to start of operation, and consumes during operation at least one of power generated by a power generation device using renewable energy and discharged power of the energy storage device that stores power generated by the power generation device, wherein the history information includes a first value indicating the energy storage amount at a first point in time, which is a point in time before the current time, and a second value indicating the energy storage amount at at least one point in time before the first point in time, and wherein the predetermined state is a state in which surplus power is predicted to be generated in a predetermined range of power grid including at least the power generation device and the energy storage device, and in which the energy storage amount of the energy storage device is predicted to exceed the first threshold value.

9. A non-transitory computer-readable recording medium storing an operation support program causing a computer to function as an operation support device for making a start determination regarding preparation for an operation of a load device, the program causing the computer to realize:

a calculation function for calculating a predicted value of an energy storage amount in an energy storage device after current time in time series based on history information indicating a history of the energy storage amount in the energy storage device by using a predetermined prediction model constructed based on records information regarding a transition of the energy storage amount in the energy storage device, and a determination function for making a start determination regarding preparation for an operation of the load device when the history information corresponds to a predetermined state, and when the predicted value within a predetermined prediction target period after the current time exceeds a predetermined first threshold value, wherein the load device is a device that requires a preparation time from start of operation preparation to start of operation, and consumes during operation at least one of power generated by a power generation device using renewable energy and discharged power of the energy storage device that stores power generated by the power generation device, wherein the history information includes a first value indicating the energy storage amount at a first point in time, which is a point in time before the current time, and a second value indicating the energy storage amount at at least one point in time before the first point in time, and wherein the predetermined state is a state in which surplus power is predicted to be generated in a predetermined range of power grid including at least the power generation device and the energy storage device, and in which the energy storage amount of the energy storage device is predicted to exceed the first threshold value.

* * * * *